United States Patent
Karino et al.

(10) Patent No.: US 10,353,722 B2
(45) Date of Patent: Jul. 16, 2019

(54) SYSTEM AND METHOD OF OFFLOADING CRYPTOGRAPHY PROCESSING FROM A VIRTUAL MACHINE TO A MANAGEMENT MODULE

(75) Inventors: Shuichi Karino, Tokyo (JP); Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 262 days.

(21) Appl. No.: 13/811,237

(22) PCT Filed: May 23, 2011

(86) PCT No.: PCT/JP2011/002841
§ 371 (c)(1),
(2), (4) Date: Jan. 18, 2013

(87) PCT Pub. No.: WO2012/011218
PCT Pub. Date: Jan. 26, 2012

(65) Prior Publication Data
US 2013/0125125 A1    May 16, 2013

(30) Foreign Application Priority Data
Jul. 21, 2010    (JP) .................. 2010-164242

(51) Int. Cl.
*G06F 9/455*    (2018.01)
*G06F 9/50*    (2006.01)
*H04L 29/06*    (2006.01)

(52) U.S. Cl.
CPC .......... *G06F 9/455* (2013.01); *G06F 9/45558* (2013.01); *G06F 9/5044* (2013.01);
(Continued)

(58) Field of Classification Search
CPC .... G06F 9/455; G06F 9/45558; G06F 9/5044; G06F 2009/45595; G06F 2209/509; H04L 63/0485; H04L 63/0236
(Continued)

(56) References Cited

U.S. PATENT DOCUMENTS 8,417,868 B2 *  4/2013  Gupta ................. H04L 63/0485
                                                         711/2
9,519,787 B2 * 12/2016  Novak .................. G06F 21/575
(Continued)

FOREIGN PATENT DOCUMENTS

JP    2002-182560 A    6/2002
JP    2007-522583 A    8/2007
(Continued)

OTHER PUBLICATIONS

Machine Translation of JP 2010081108 A.*
(Continued)

*Primary Examiner* — James J Lee
*Assistant Examiner* — Willy W Huaracha
(74) *Attorney, Agent, or Firm* — McGinn IP Law Group, PLLC

(57) ABSTRACT

A computer system has: a virtual machine operating on a physical machine; and a management block operating on the physical machine and managing the virtual machine. The virtual machine has a specific function processing module that performs specific function processing with respect to a packet for transmission and a received packet. The management block has a virtual switch that relays a packet transmitted and received by the virtual machine. The virtual switch has an offload processing block that performs the specific function processing if the specific function processing is offloaded to the management block. If the specific function processing is offloaded from the virtual machine to
(Continued)

the management block, the specific function processing module notifies the management block of processing information required for the specific function processing, and the offload processing block executes the specific function processing based on the processing information received from the virtual machine.

17 Claims, 27 Drawing Sheets

(52) U.S. Cl.
CPC .............. *H04L 63/0485* (2013.01); *G06F 2009/45595* (2013.01); *G06F 2209/509* (2013.01); *H04L 63/0236* (2013.01)

(58) Field of Classification Search
USPC .......................................................... 718/1
See application file for complete search history.

(56) References Cited

U.S. PATENT DOCUMENTS

| | | | |
|---|---|---|---|
| 2003/0005126 A1* | 1/2003 | Schwartz et al. | 709/227 |
| 2005/0182853 A1 | 8/2005 | Lewites et al. | |
| 2008/0276299 A1* | 11/2008 | Lee et al. | 726/2 |
| 2009/0086979 A1* | 4/2009 | Brutch | H04L 9/0836 380/279 |
| 2009/0328225 A1* | 12/2009 | Chambers | G06F 21/10 726/26 |
| 2012/0210318 A1* | 8/2012 | Sanghvi et al. | 718/1 |
| 2012/0291025 A1* | 11/2012 | Kidambi et al. | 718/1 |
| 2012/0291029 A1* | 11/2012 | Kidambi et al. | 718/1 |
| 2013/0061047 A1* | 3/2013 | Sridharan | H04L 45/586 713/162 |
| 2014/0215463 A1* | 7/2014 | Hendel | G06F 9/45533 718/1 |

FOREIGN PATENT DOCUMENTS

| | | |
|---|---|---|
| JP | 2008-171076 A | 7/2008 |
| JP | 2010-81108 A | 4/2010 |
| JP | 2010081108 A * | 4/2010 |

OTHER PUBLICATIONS

International Search Report (ISR) (PCT Form PCT/ISA/210) dated Jun. 14, 2011, in PCT/JP2011/002841.

Paul Barham et al., "Xen and the Art of Virtualization", Proceedings of the nineteenth ACM symposium on Operating systems principles, pp. 164-177, 2003.

* cited by examiner (RELATED ART) Fig. 3

[Fig. 6]
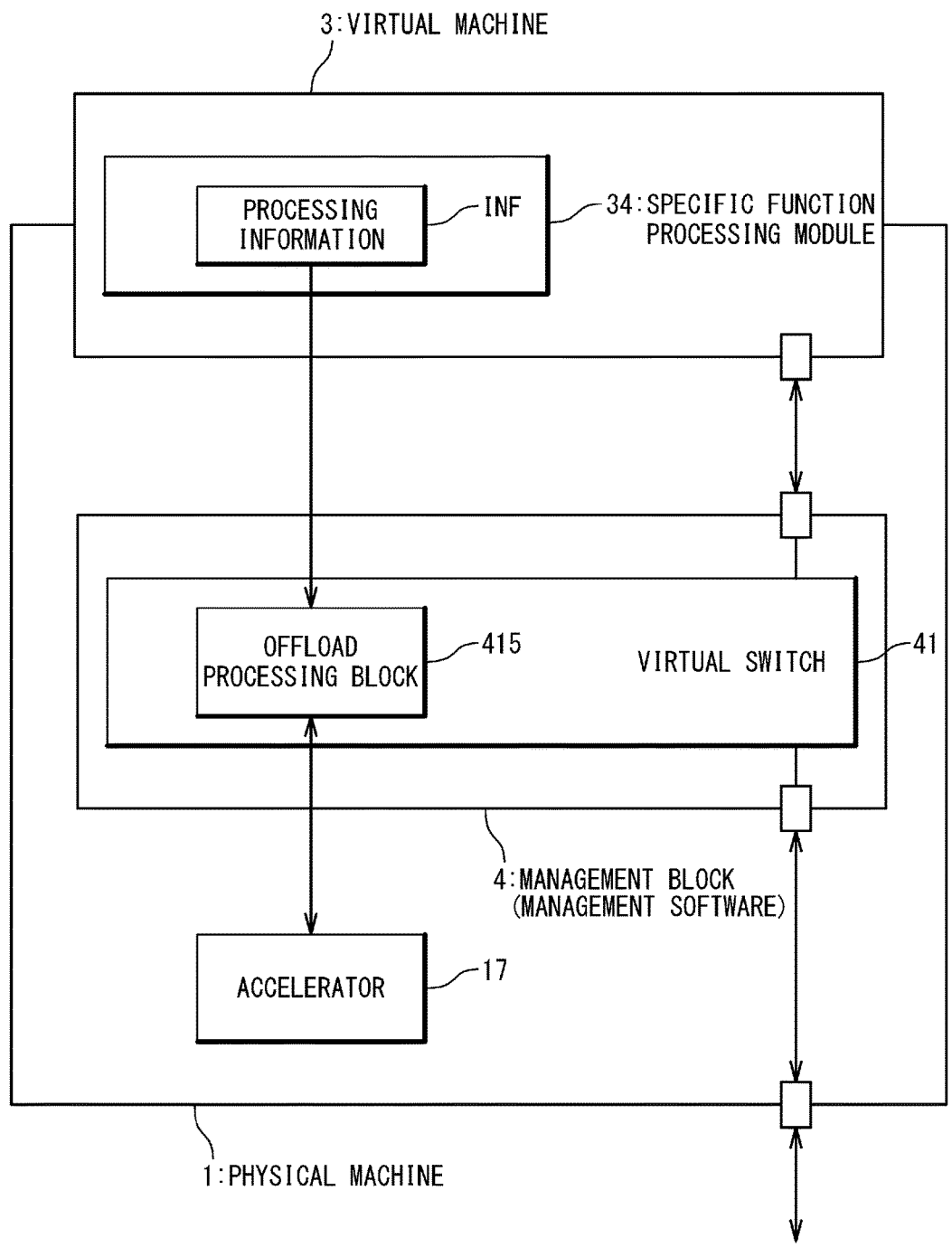

[Fig. 7]
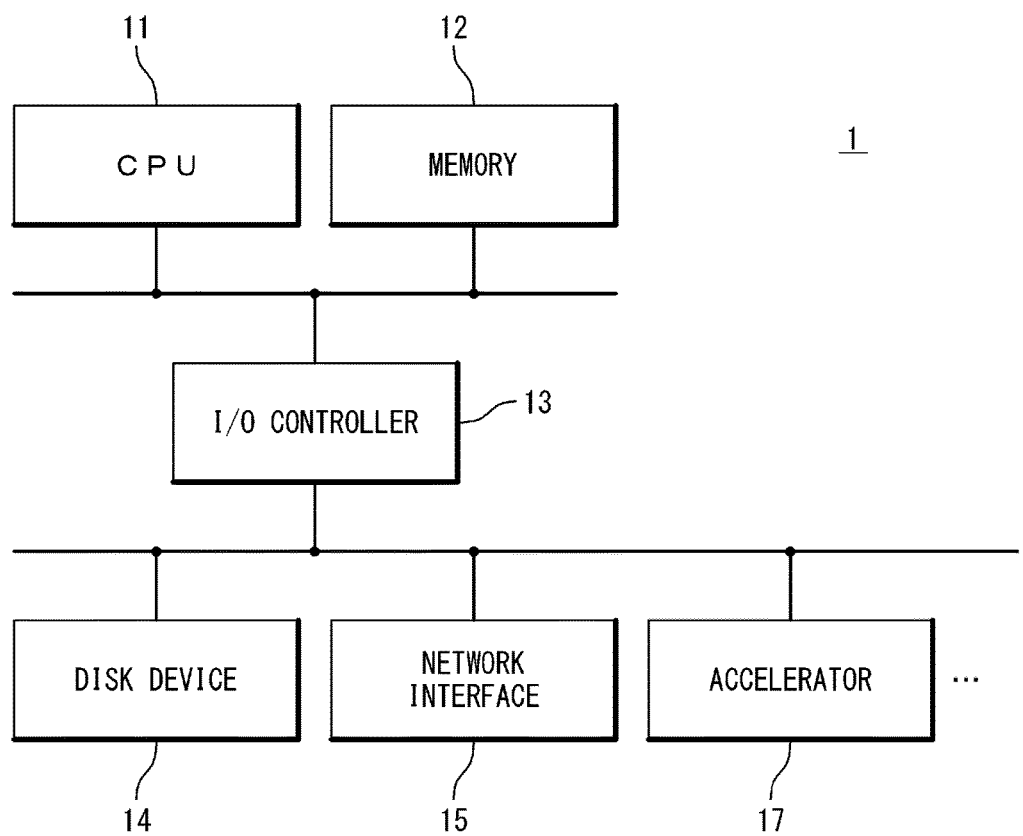

[Fig. 8]
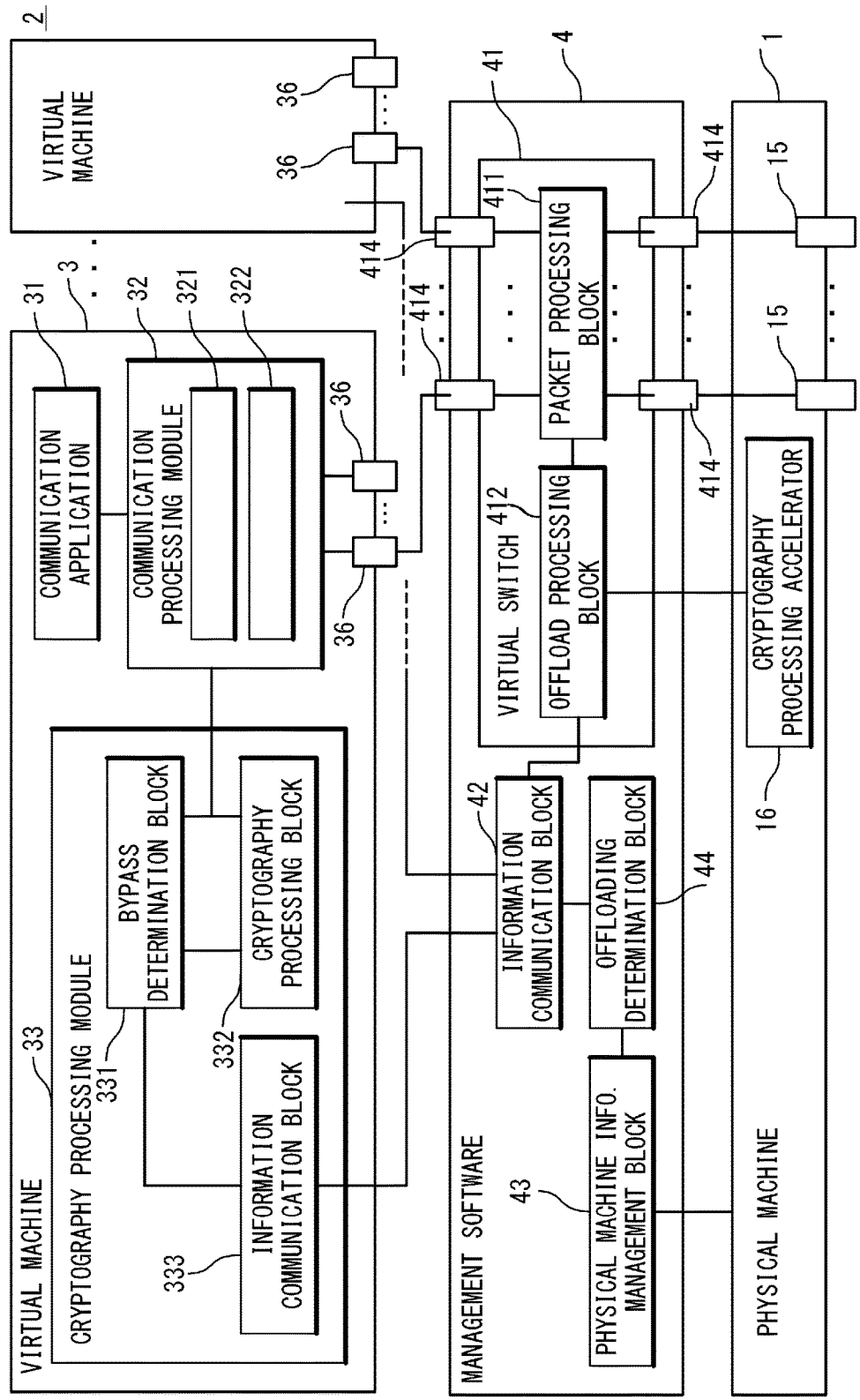

[Fig. 9]
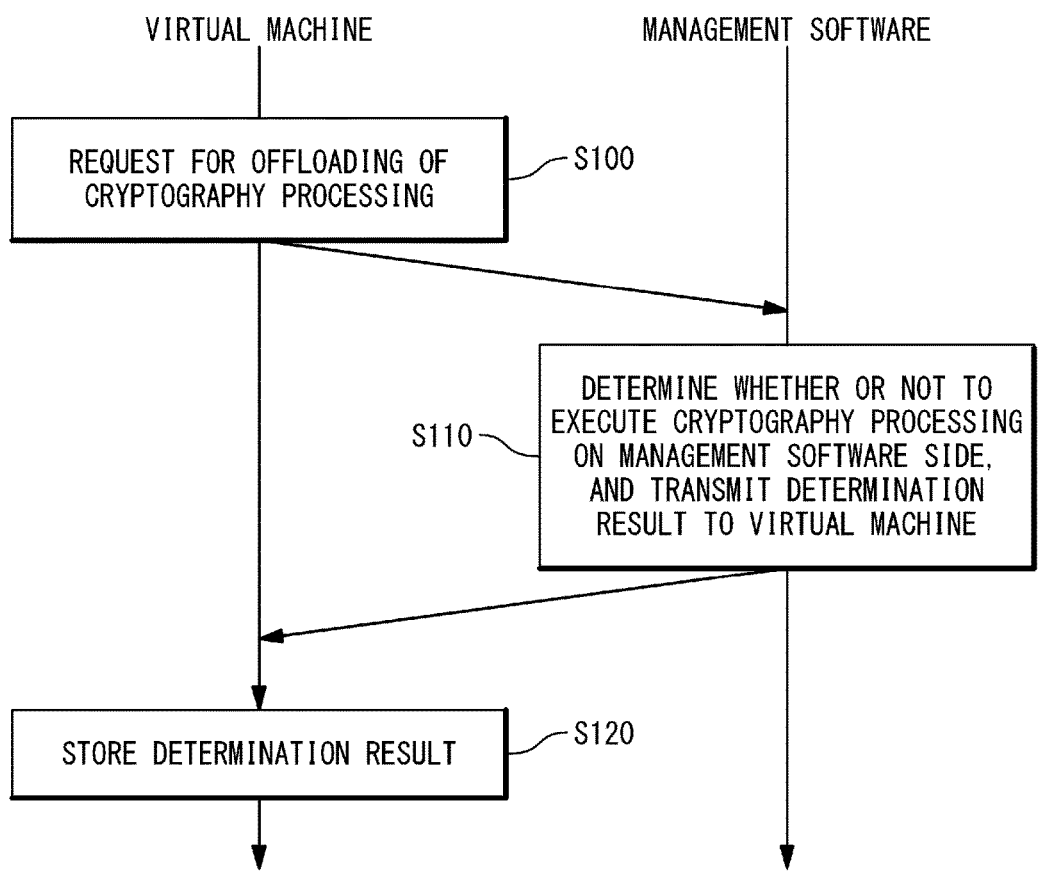

[Fig. 10]
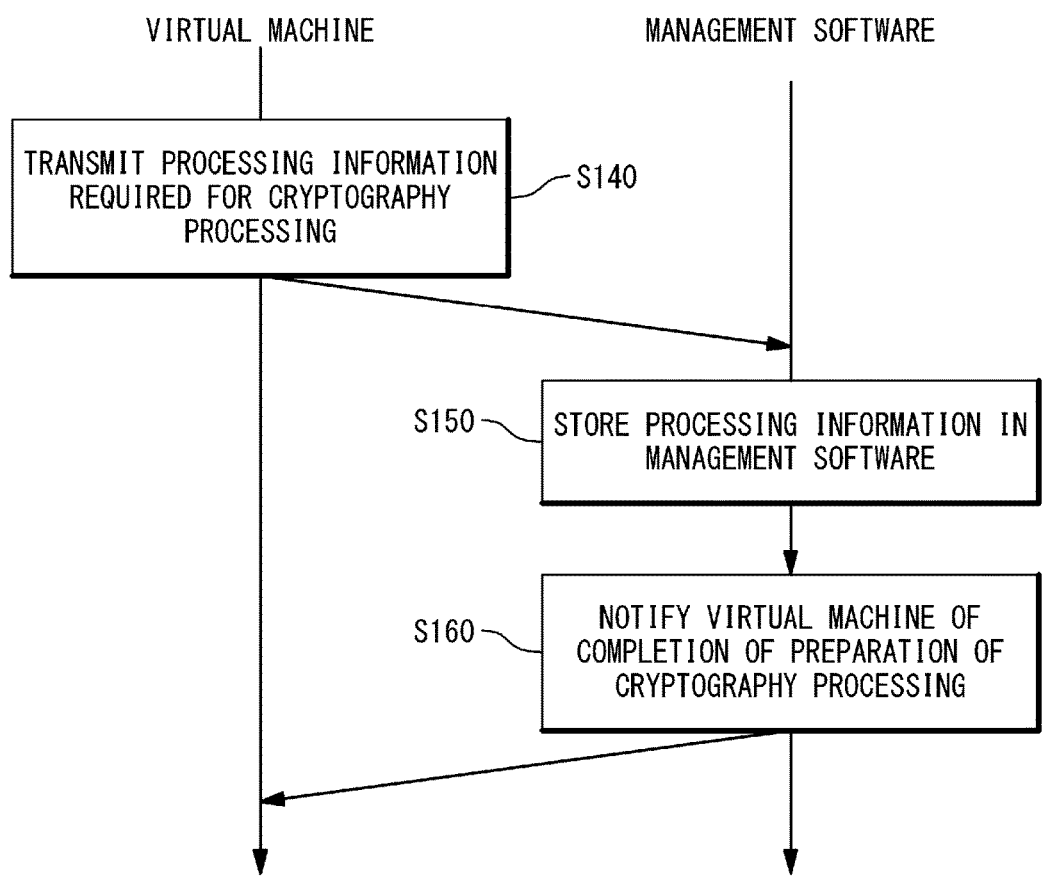

[Fig. 11]
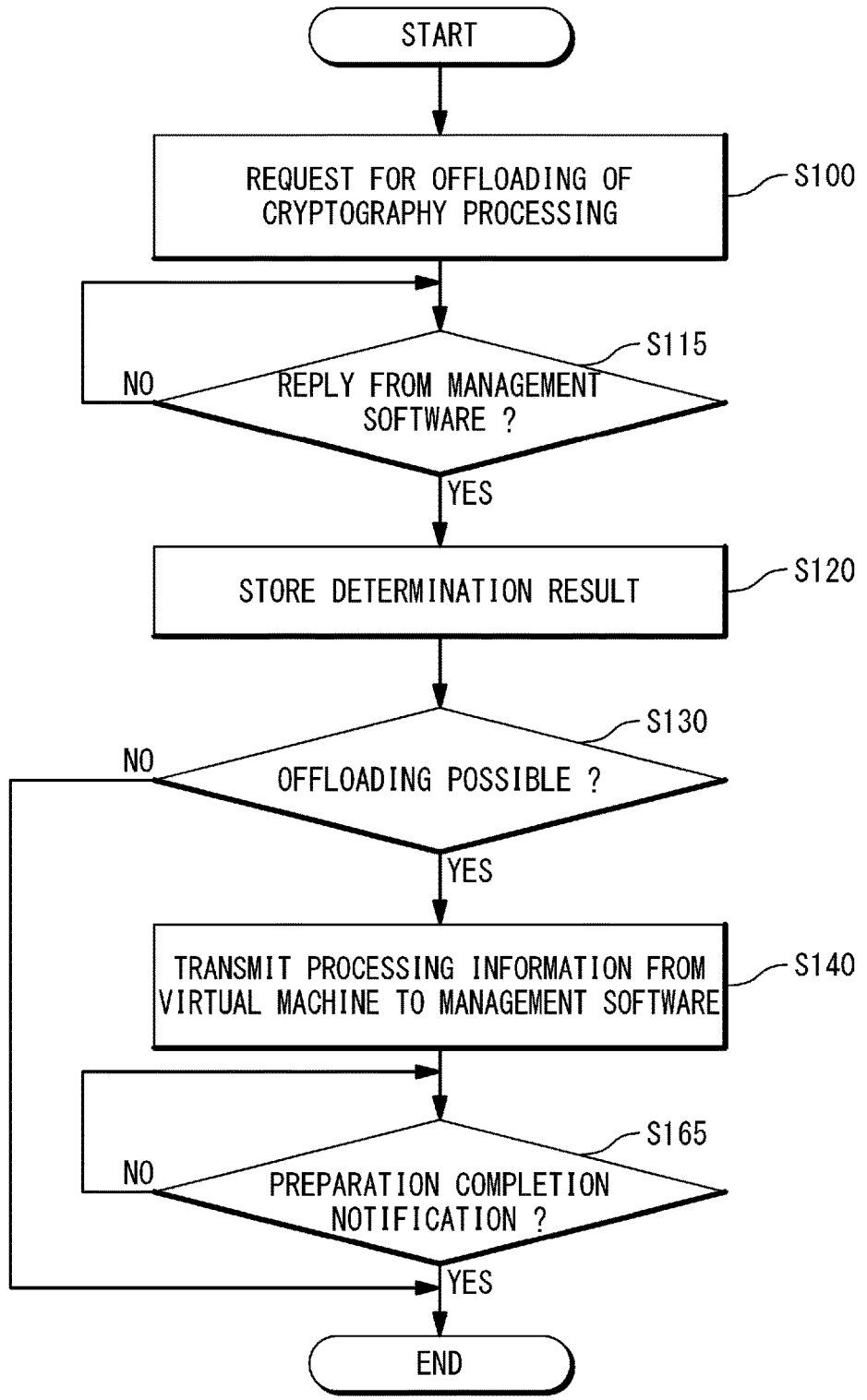

[Fig. 12]
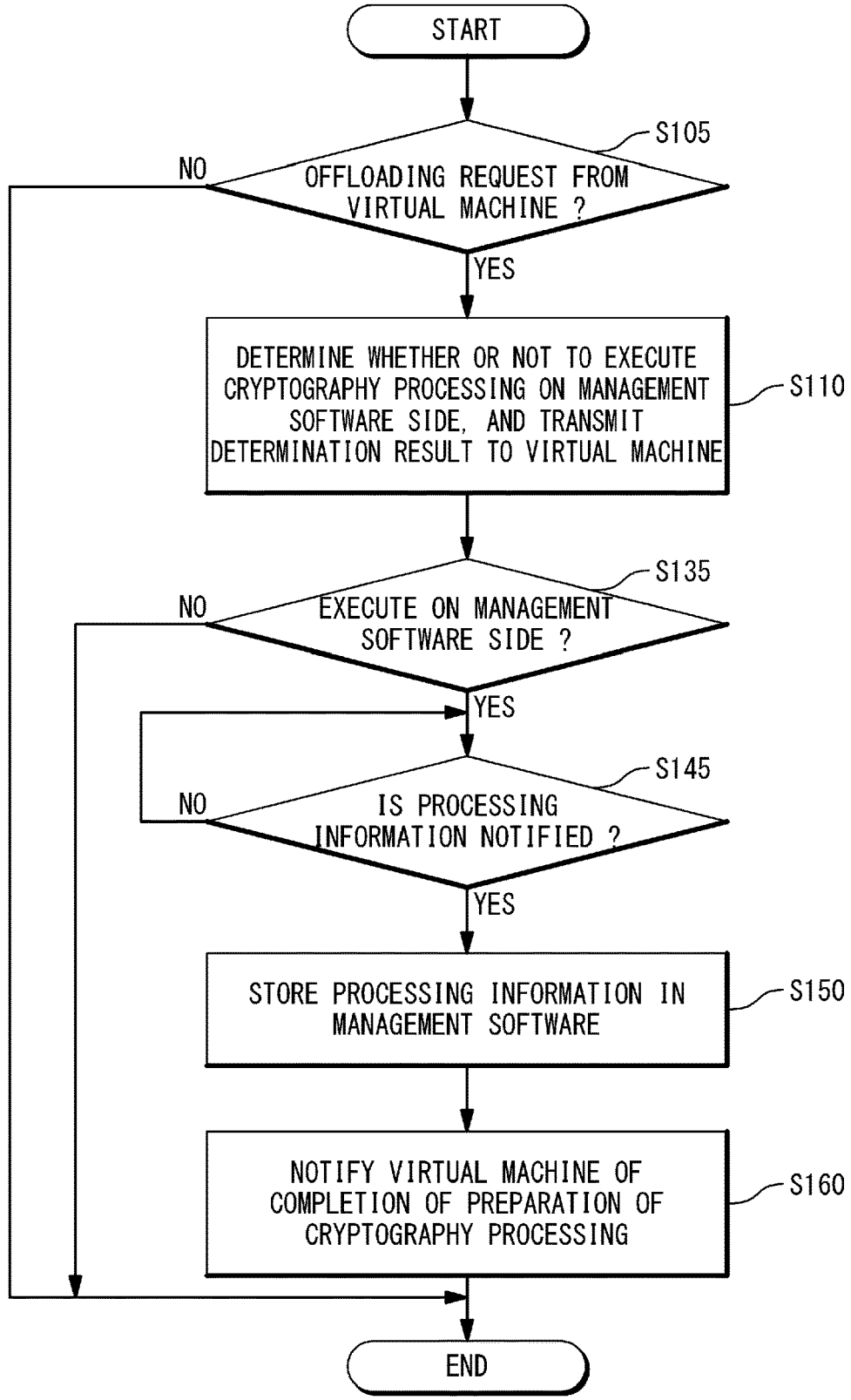

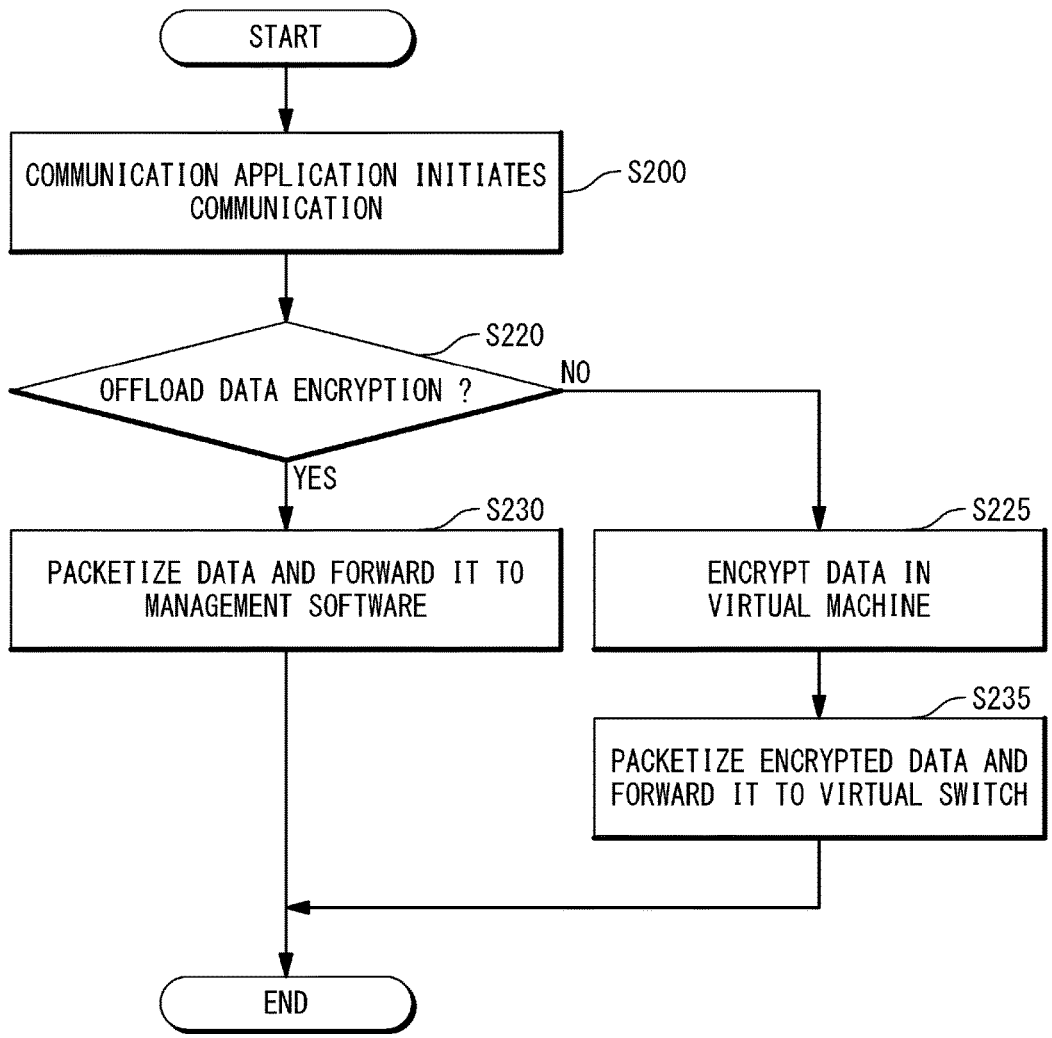
[Fig. 13]

[Fig. 14]
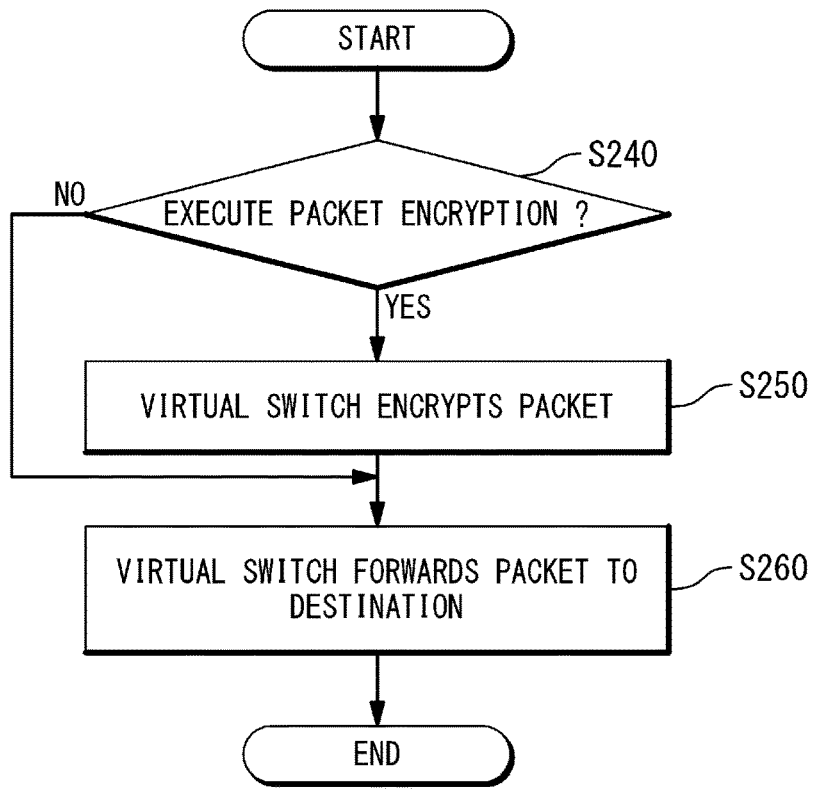
[Fig. 15]
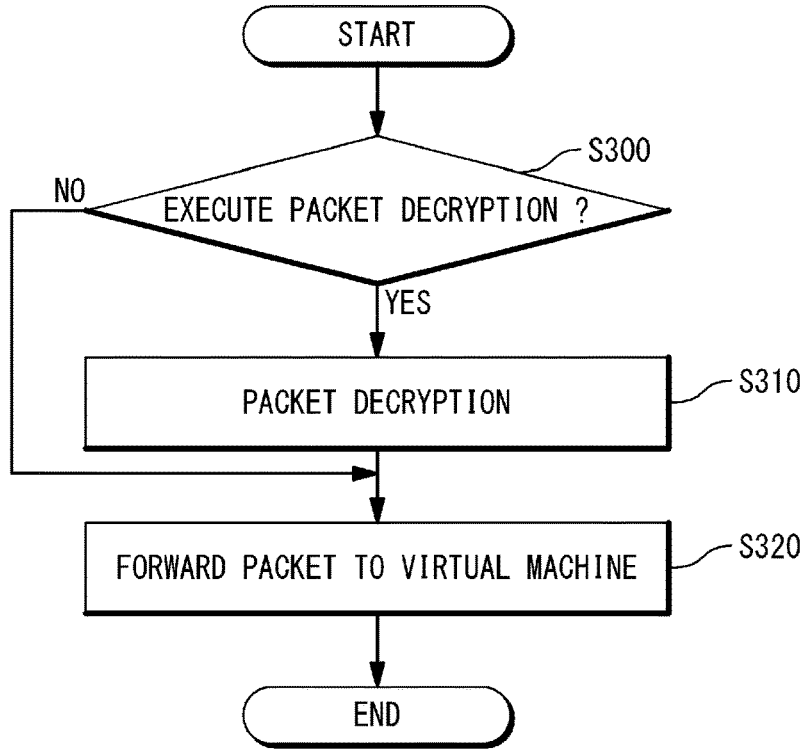

[Fig. 16]
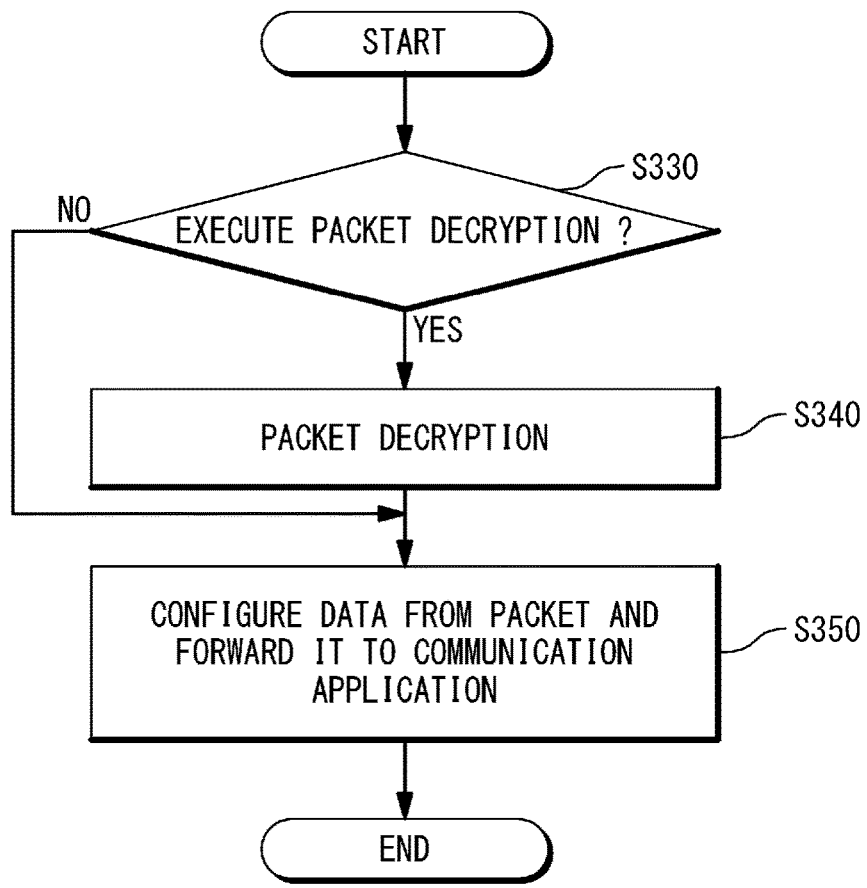

[Fig. 17]
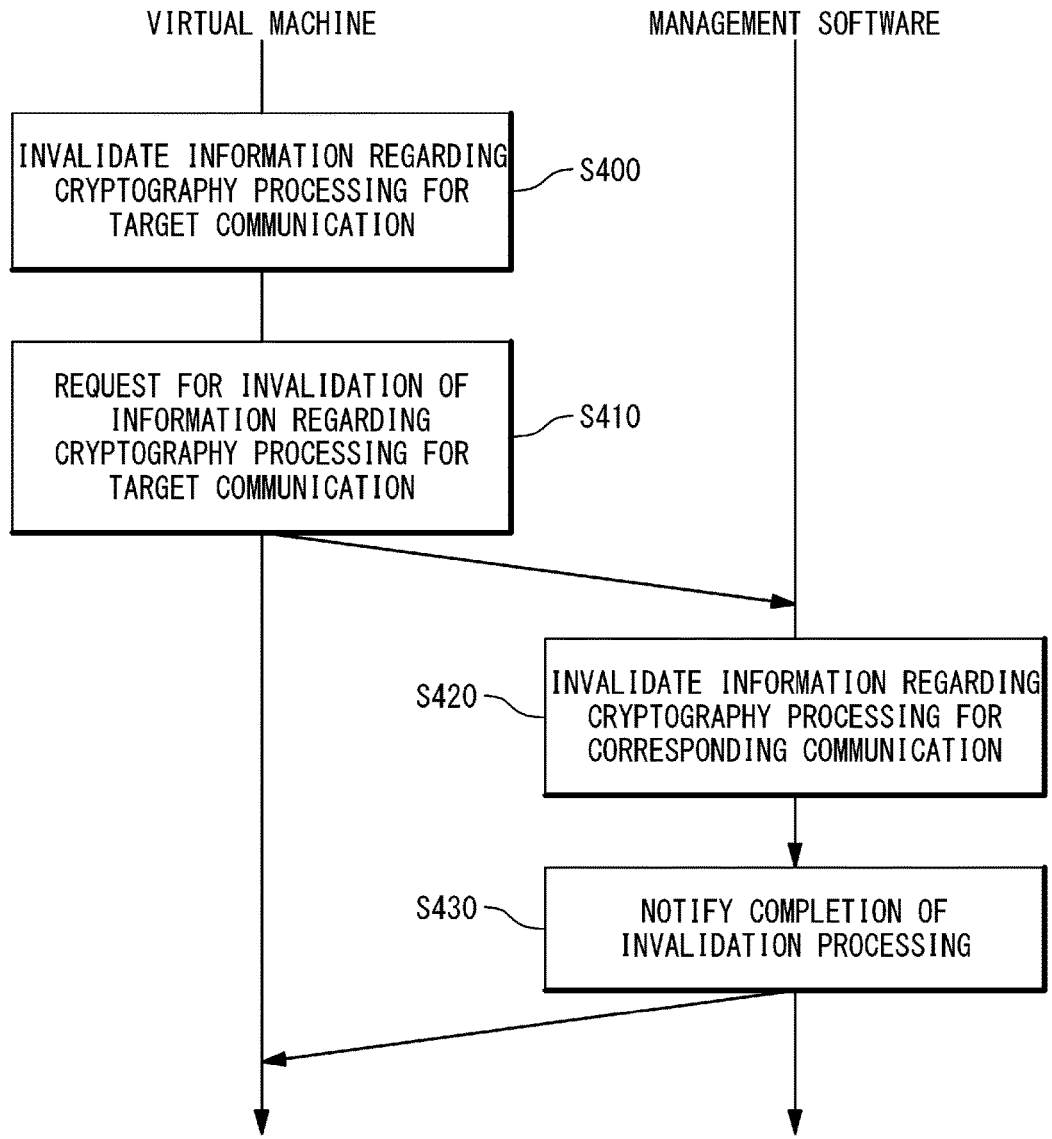

[Fig. 18]
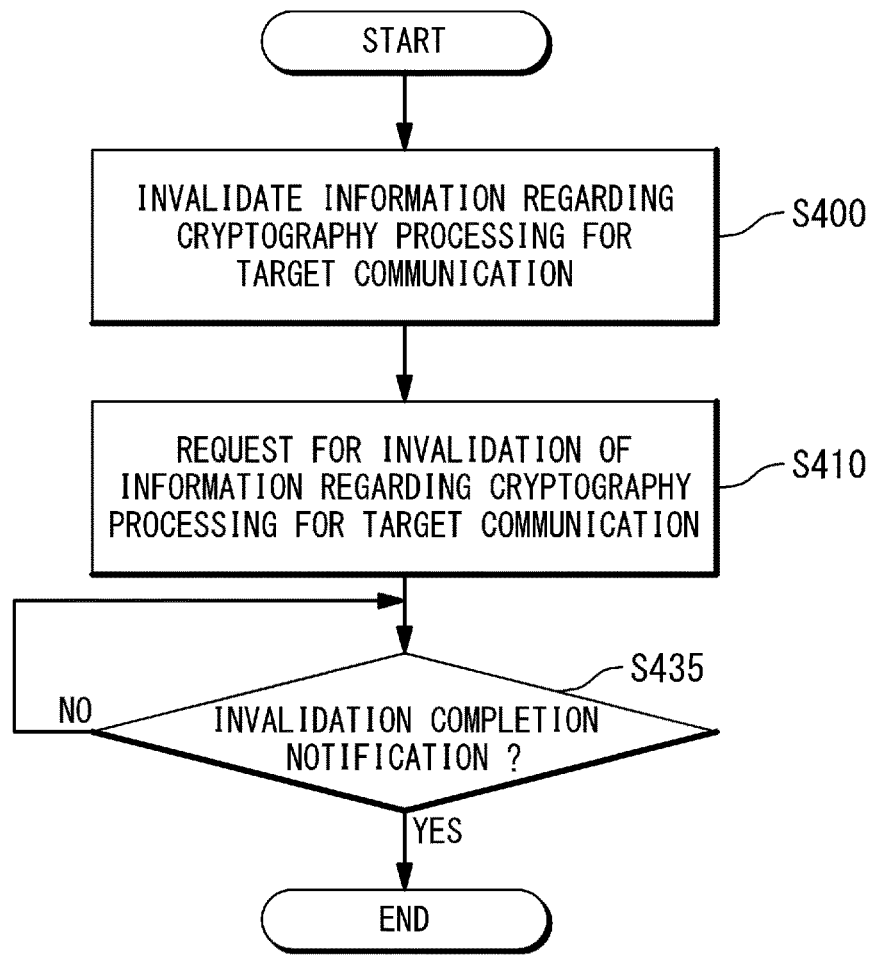

[Fig. 19]
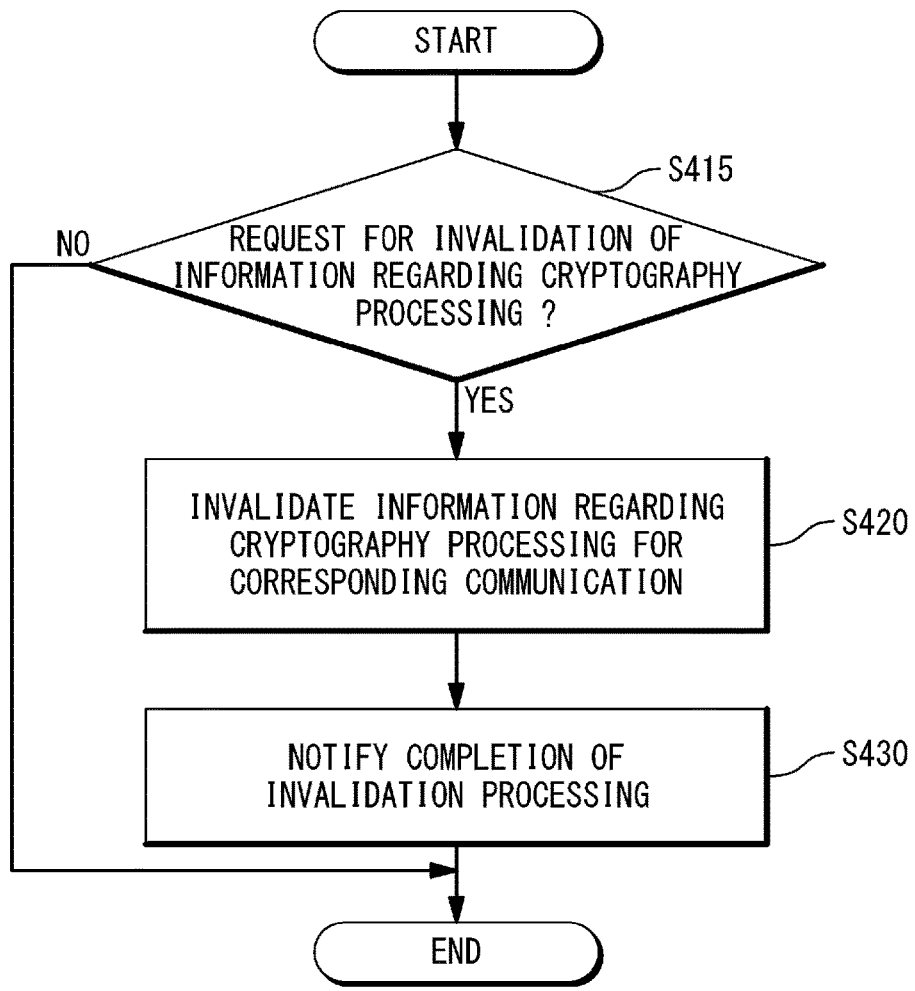

[Fig. 20]
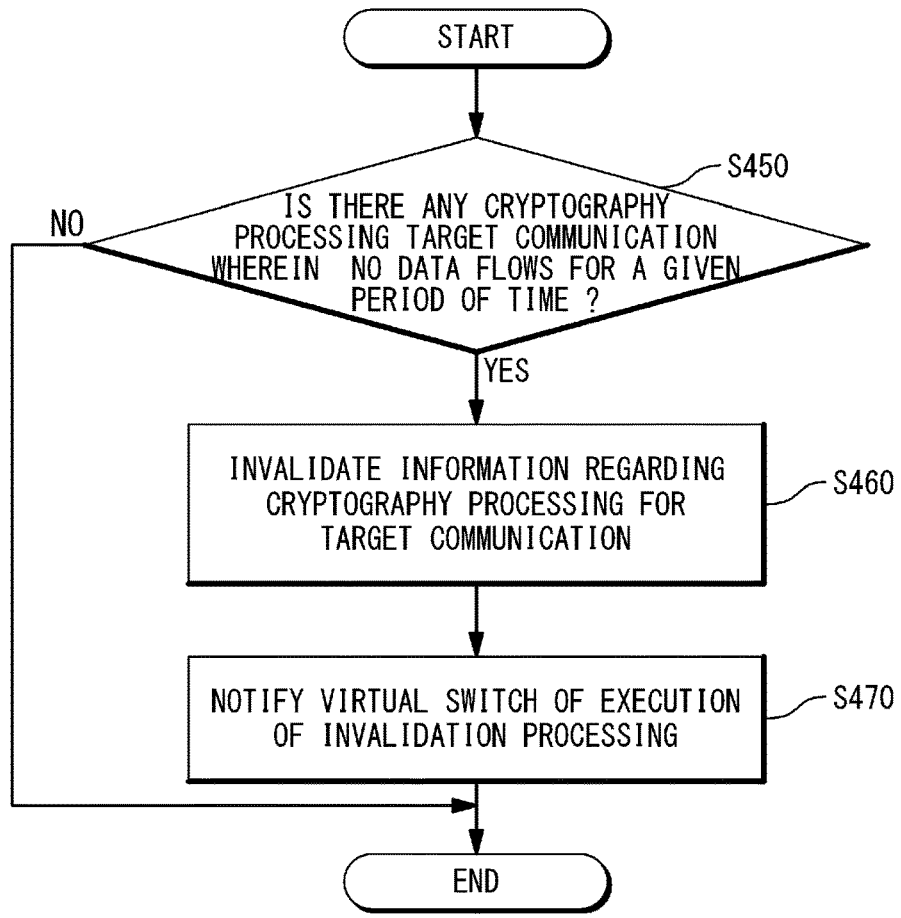
[Fig. 21]
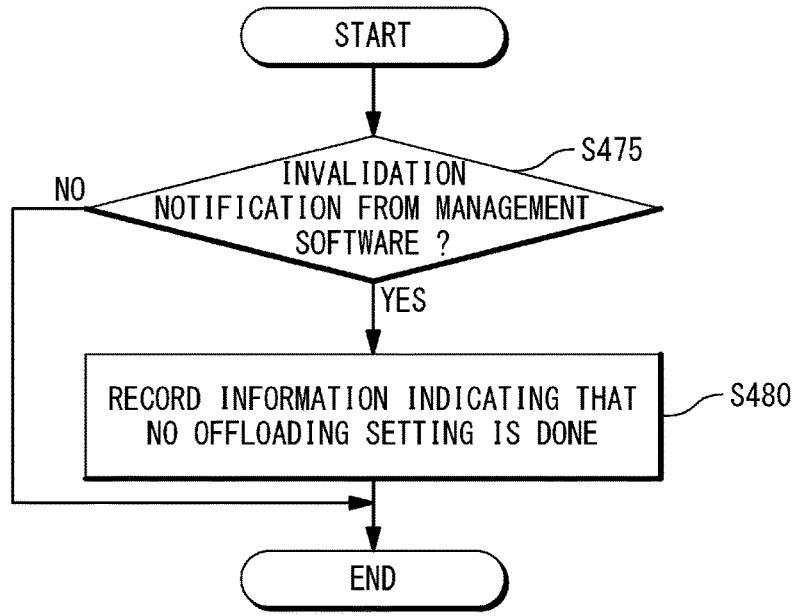

[Fig. 22]
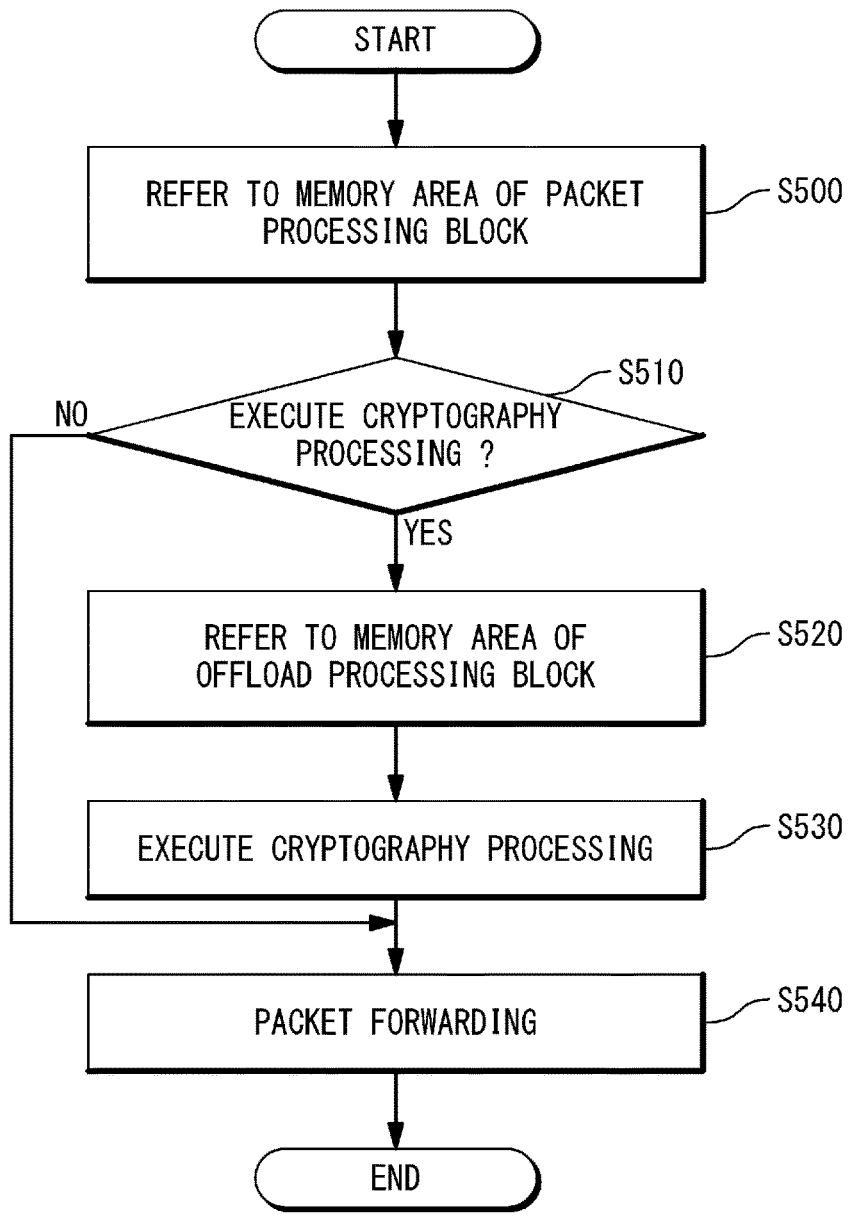

[Fig. 23]
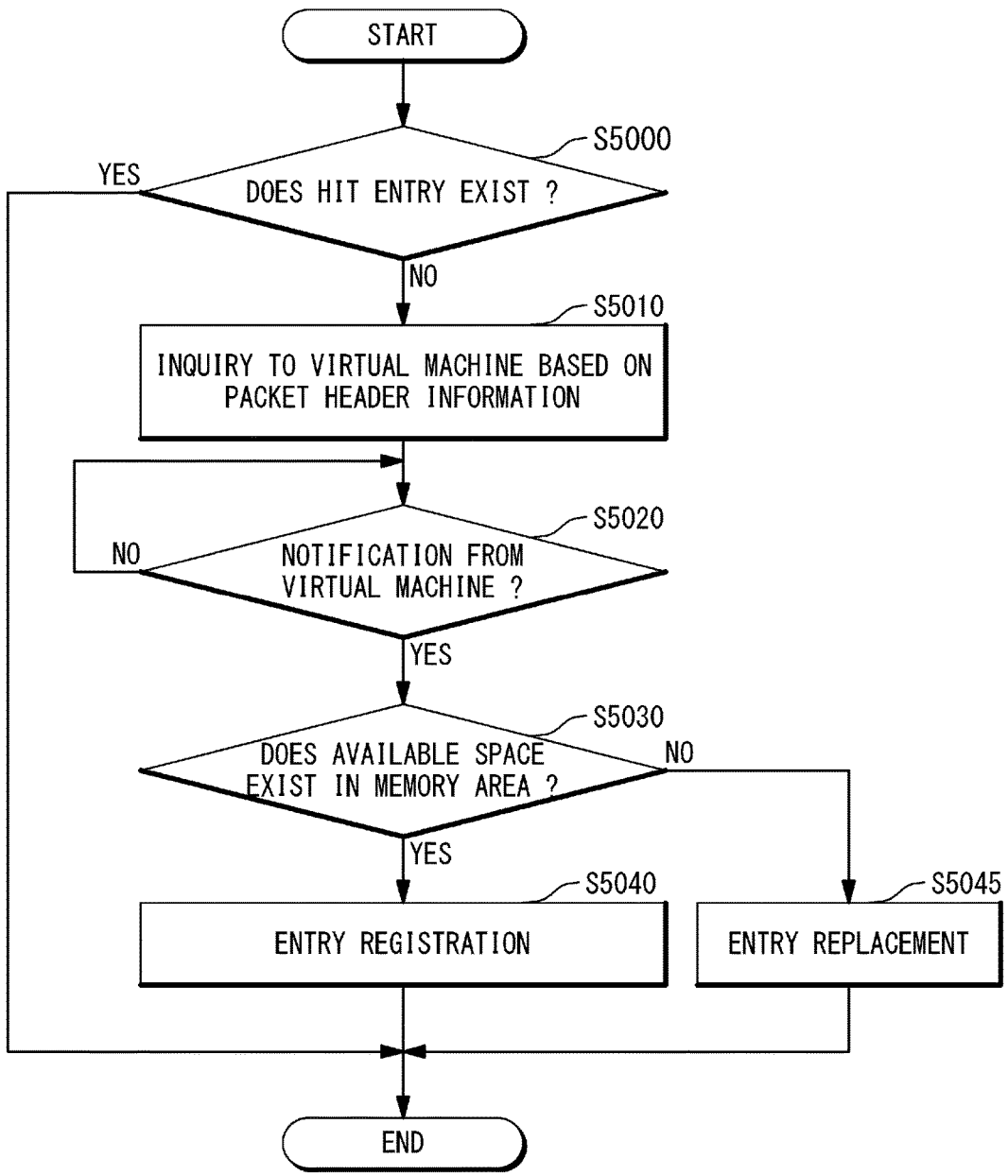

[Fig. 24]
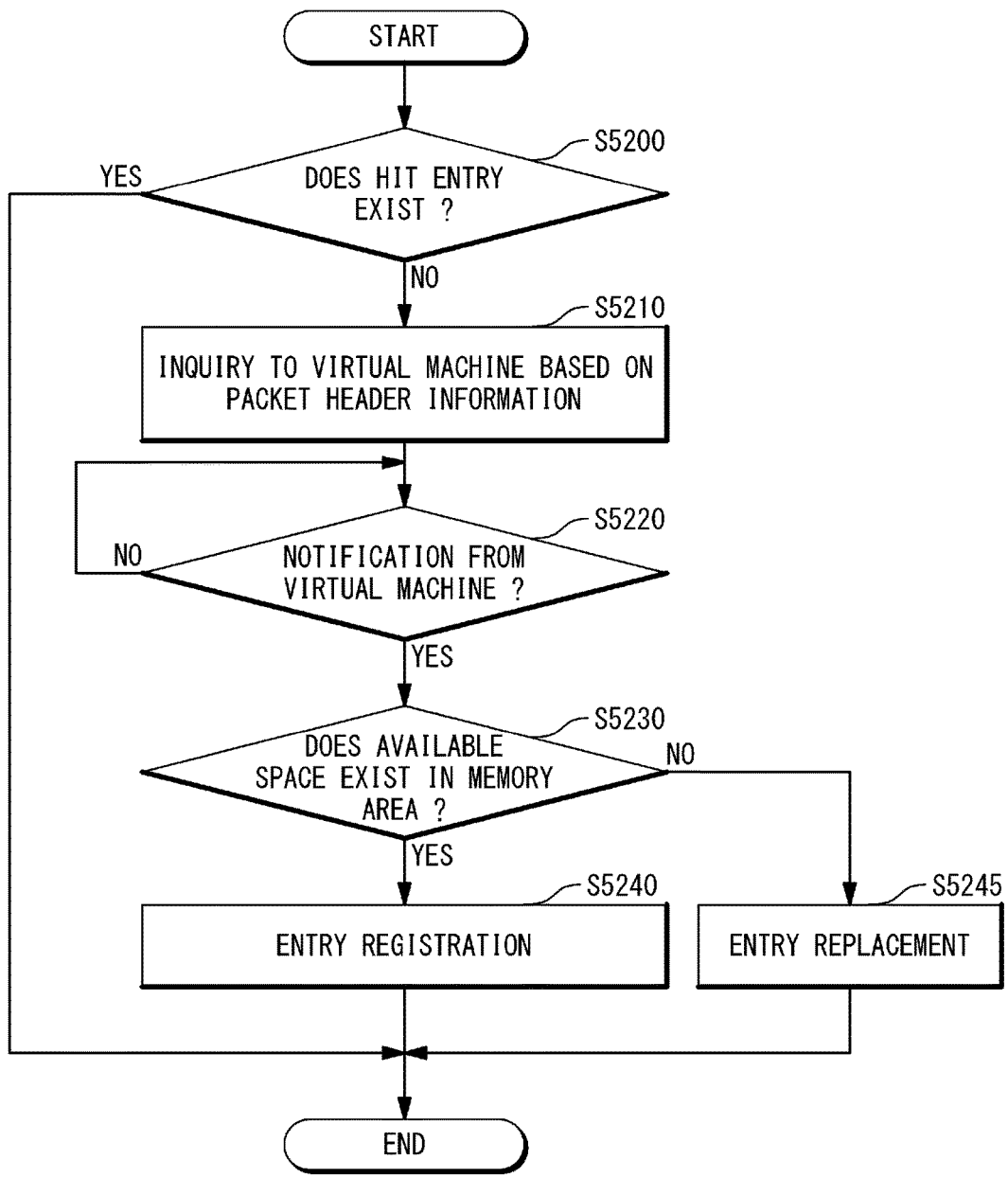

[Fig. 25]
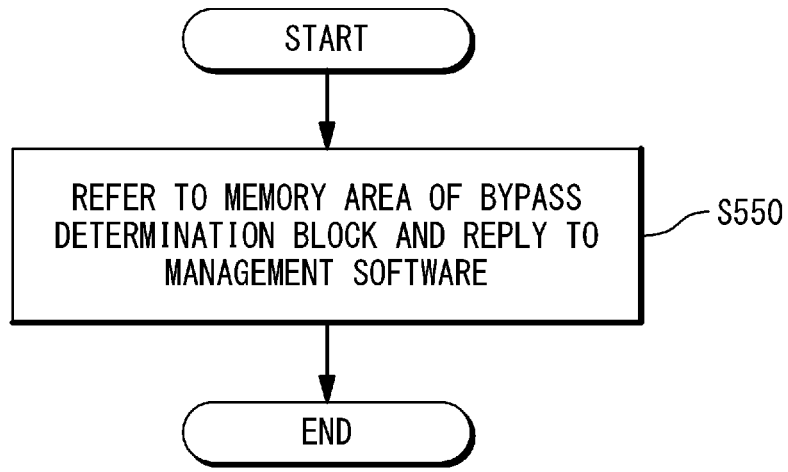

[Fig. 26]
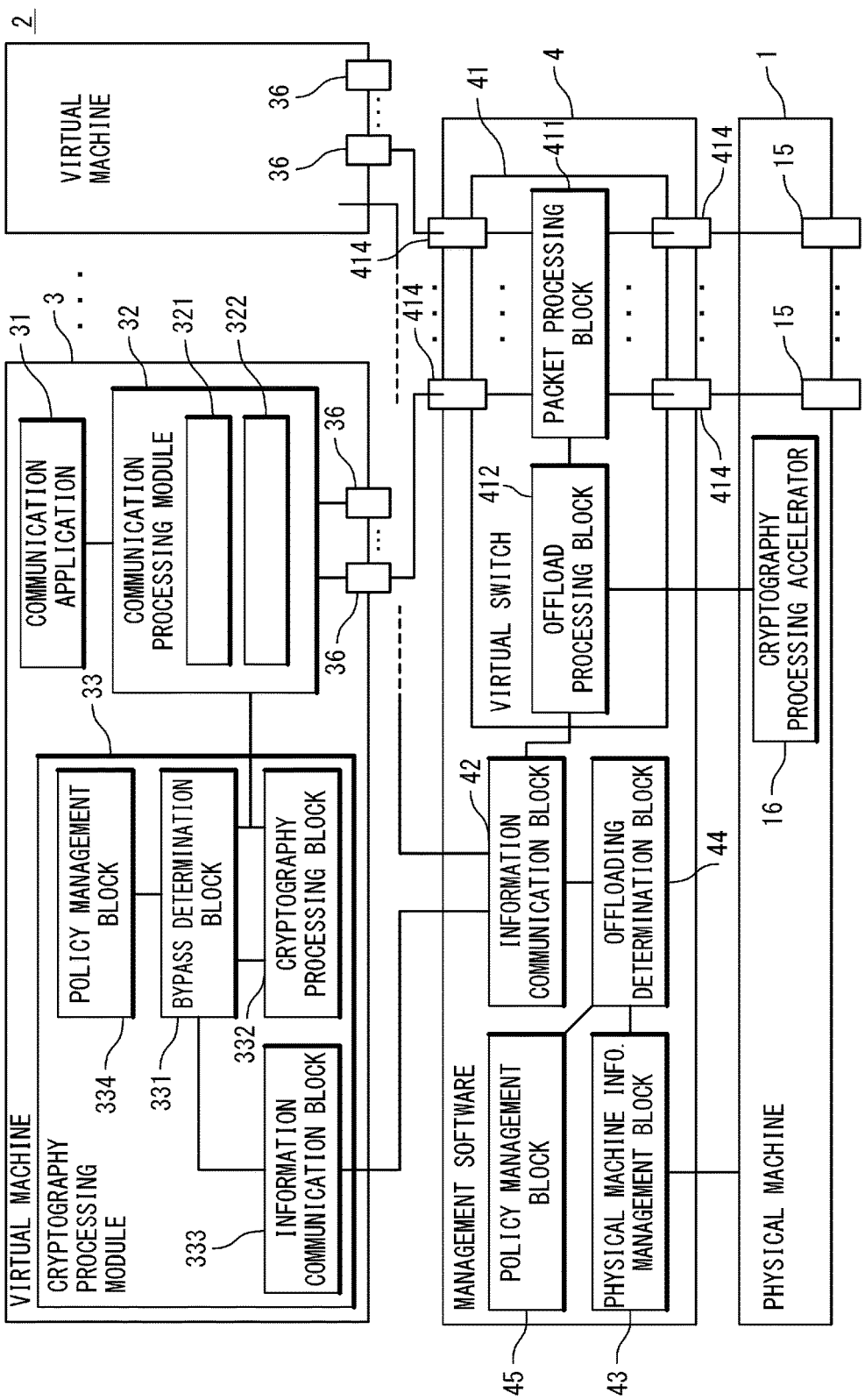

[Fig. 27]
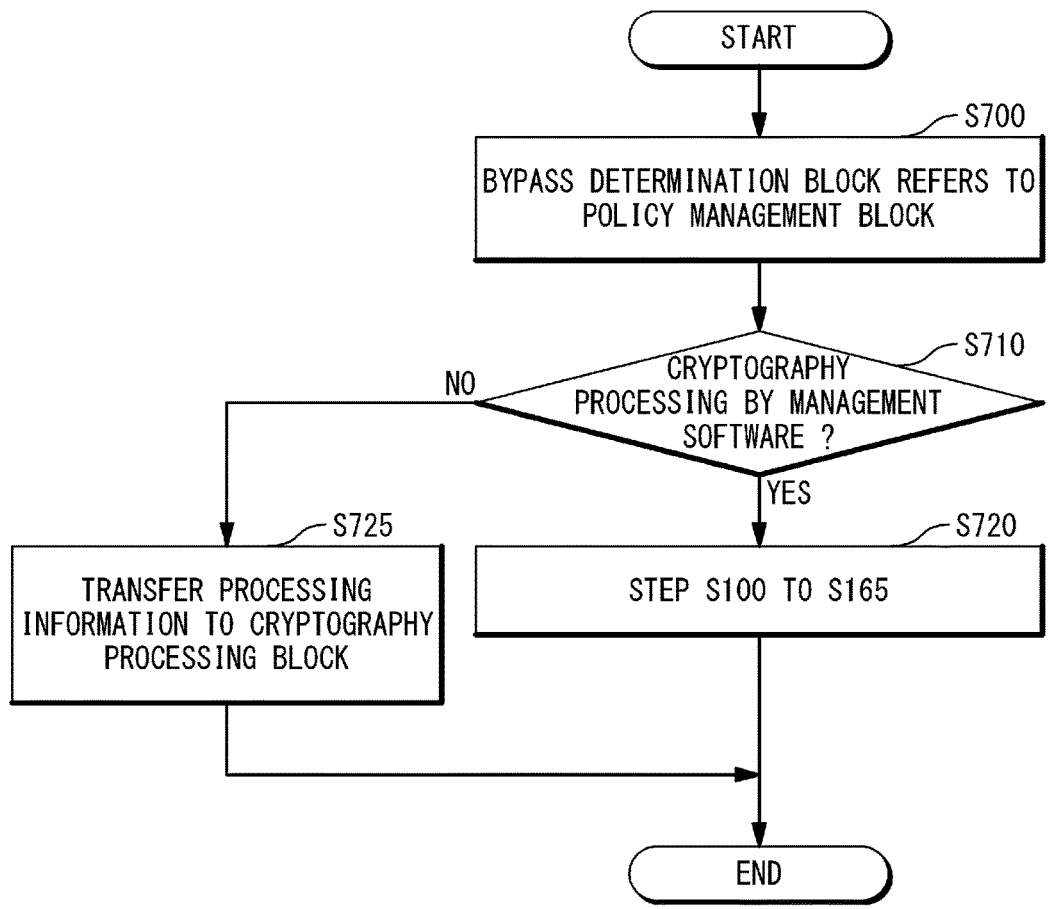

[Fig. 28]
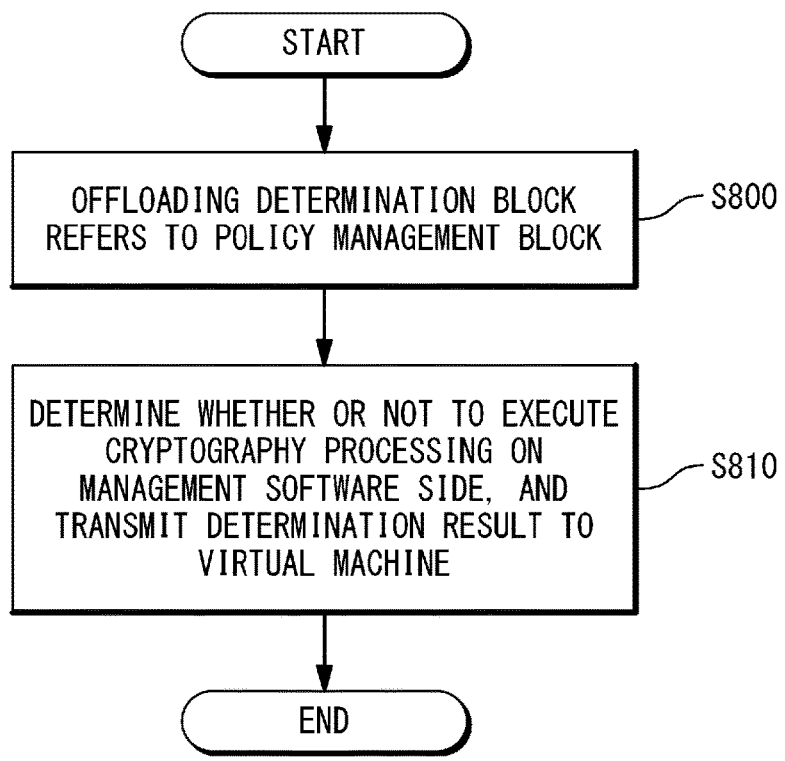

[Fig. 29]
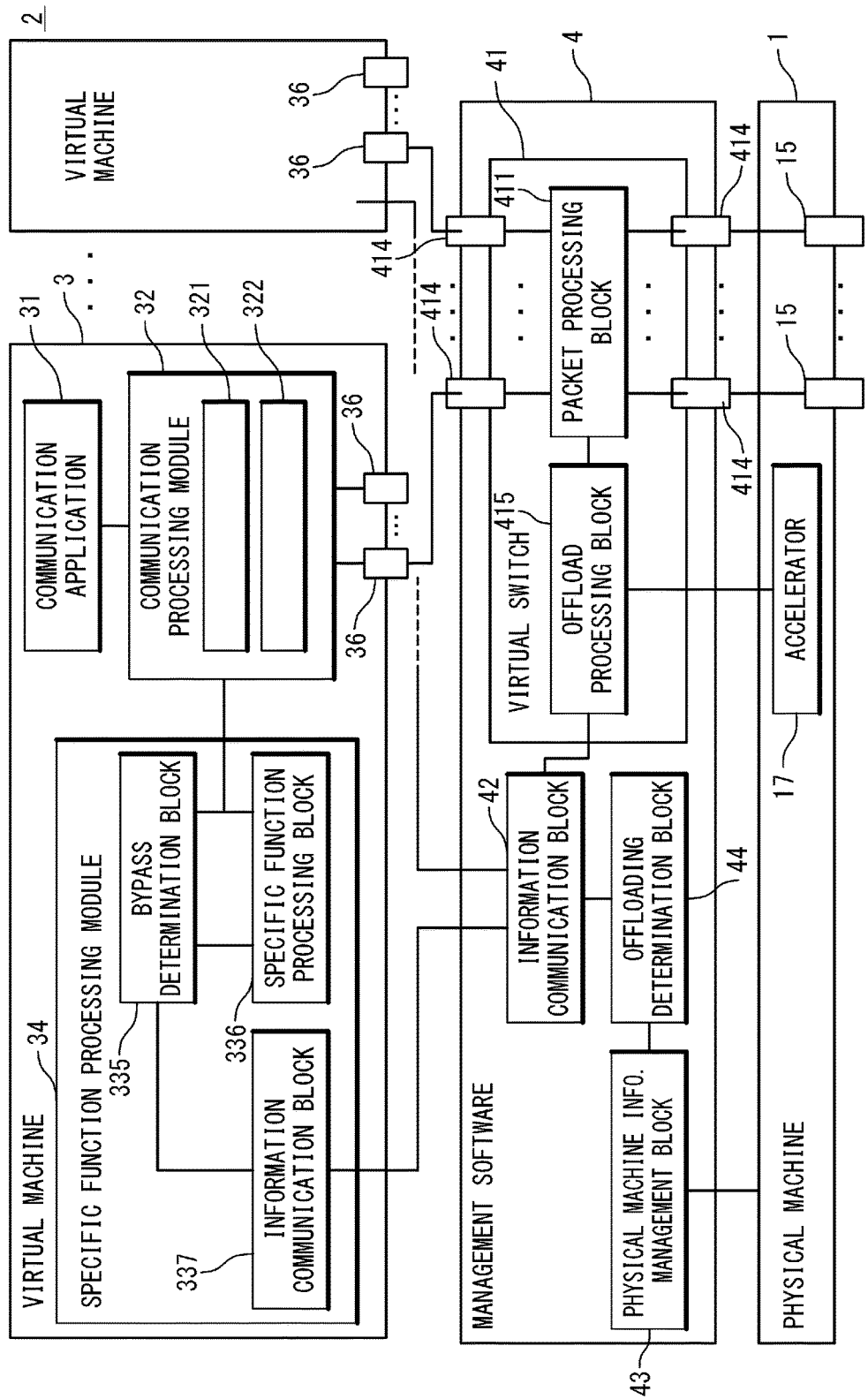

SYSTEM AND METHOD OF OFFLOADING CRYPTOGRAPHY PROCESSING FROM A VIRTUAL MACHINE TO A MANAGEMENT MODULE

TECHNICAL FIELD

The present invention relates to a computer system provided with a virtual machine. In particular, the present invention relates to a technique of offloading specific function processing by the virtual machine in the computer system provided with the virtual machine.

BACKGROUND ART

A virtualization technology is important in a field of server. Specifically, it is possible to operate one physical machine as a plurality of virtual machines (VM: Virtual Machine) by the virtualization technology using virtualization software such as VMware (registered trademark) and Xen (registered trademark) (refer, for example, to Non-Patent Literature 1). Thus, efficient server operation is possible.

FIG. 1 is a block diagram showing a typical virtual machine environment. In FIG. 1, a plurality of virtual machines are constructed on one physical machine. Each virtual machine has a communication unit such as protocol stack for communicating with other virtual machines and the physical machine. The communication unit performs communication through a virtual network interface.

Typically, the plurality of virtual machines are managed by management software such as hypervisor. The management software is included in the virtualization software and operates on the physical machine like the virtual machine. The management software has a virtual switch (Virtual Switch). The virtual switch, which is a software-based packet switch, relays communications between the virtual machines and communications between the virtual machine and the physical machine.

Also, there is known a technology that encrypts communication according to a cryptography protocol such as SSL (Secure Socket Layer) in order to increase communication security (refer to Patent Literature 1). FIG. 2 shows a case where each virtual machine performs cryptography processing. As shown in FIG. 2, the function of cryptography processing is implemented in each virtual machine individually. It should be noted in the present description that the "cryptography processing" includes both of encryption processing and decryption processing.

FIG. 3 shows a case where the management software has a filtering function. The filtering function determines whether or not a packet includes a specific data and, if included, performs a predetermined processing with respect to the packet. For example, the filtering function drops a packet if a specific character string is included in a data section of the packet.

Let us consider a case where each virtual machine in FIG. 3 performs the encrypted communication. In this case, communication content (packet data) is encrypted and the management software may not be able to execute the filtering processing. The reason is that the management software does not have a decryption function. Therefore, as matters now stand, it is necessary as shown in FIG. 4 to first execute decryption processing in a decryption processing virtual machine and then execute the filtering processing in the management software. Such the processing causes increase in overhead of the filtering processing, which is not desirable. Such a problem can arise in a spam mail filtering system, for example. A similar problem can also arise, for example, in a case where the management software has a regular expression search function.

Also, in recent years, a cryptography processing accelerator that performs the cryptography processing at high-speed may be installed in the physical machine as shown in FIG. 5. The cryptography processing accelerator may be incorporated into hardware such as an expansion card or may be achieved by a software program. Here, let us consider a case where the virtual machine performs the cryptography processing by utilizing the cryptography processing accelerator of the physical machine. In this case, the virtual machine typically uses an interface different from the virtual network interface in order to utilize the cryptography processing accelerator. Therefore, a mechanism that performs scheduling between virtual machines and exclusive access control is required.

CITATION LIST

Patent Literature

[PTL 1]
Japanese Patent Publication JP-2002-182560
[Non-Patent Literature]
[NPL 1]
Paul Barham et al., "Xen and the Art of Virtualization", Proceedings of the nineteenth ACM symposium on Operating systems principles, pp. 164-177, 2003.

SUMMARY OF INVENTION

As shown in FIG. 4, in the case where each virtual machine performs the cryptography processing, overhead of the filtering processing in the management software is increased. That is, a processing efficiency of a computer system is deteriorated. Such a problem is not limited to the case of the cryptography processing. More generally, let us consider a case where the virtual machine performs specific function processing. A processing efficiency of a computer system may be deteriorated if the management software cannot execute the specific function processing.

An object of the present invention is to improve a processing efficiency of a computer system that has a virtual machine performing specific function processing.

In an aspect of the present invention, a computer system is provided. The computer system has: a virtual machine operating on a physical machine; and a management block operating on the physical machine and managing the virtual machine. The virtual machine has a specific function processing module configured to perform specific function processing with respect to a packet for transmission and a received packet. The management block has a virtual switch configured to relay a packet transmitted and received by the virtual machine. The virtual switch has an offload processing block configured to perform the specific function processing if the specific function processing is offloaded to the management block. If the specific function processing is offloaded from the virtual machine to the management block, the specific function processing module notifies the management block of processing information required for the specific function processing, and the offload processing block executes the specific function processing based on the processing information received from the virtual machine.

In another aspect of the present invention, an offloading method in a computer system is provided. The computer system has: a virtual machine operating on a physical machine; and a management block operating on the physical machine and managing the virtual machine. The virtual machine has a function of performing specific function processing with respect to a packet for transmission and a received packet. The management block has a virtual switch configured to relay a packet transmitted and received by the virtual machine. The offloading method according to the present invention includes: (A) providing the virtual switch with an offload processing block that performs the specific function processing; (B) notifying the management block of processing information required for the specific function processing, if the specific function processing is offloaded from the virtual machine to the management block; and (C) executing, by the offload processing block, the specific function processing based on the processing information.

In still another aspect of the present invention, a program that, when executed by a physical machine, constructs a computer system on the physical machine is provided. The computer system has: a virtual machine operating on a physical machine; and a management block operating on the physical machine and managing the virtual machine. The virtual machine has a specific function processing module configured to perform specific function processing with respect to a packet for transmission and a received packet. The management block has a virtual switch configured to relay a packet transmitted and received by the virtual machine. The virtual switch has an offload processing block configured to perform the specific function processing if the specific function processing is offloaded to the management block. If the specific function processing is offloaded from the virtual machine to the management block, the specific function processing module notifies the management block of processing information required for the specific function processing, and the offload processing block executes the specific function processing based on the processing information received from the virtual machine.

According to the present invention, it is possible to improve the processing efficiency of the computer system that has the virtual machine performing specific function processing.

BRIEF DESCRIPTION OF DRAWINGS

FIG. 6 is a block diagram schematically showing a configuration of a computer system according to an exemplary embodiment of the present invention.

FIG. 7 is a block diagram schematically showing an example of a hardware configuration of a physical machine according to the exemplary embodiment of the present invention.

FIG. 8 is a block diagram showing a configuration of a computer system according to a first exemplary embodiment of the present invention.

FIG. 9 is a sequence diagram showing offload request processing in the first exemplary embodiment.

FIG. 10 is a sequence diagram showing offload preparation processing in the first exemplary embodiment.

FIG. 11 is a flow chart showing processing by a virtual machine in FIG. 9 and FIG. 10.

FIG. 12 is a flow chart showing processing by management software in FIG. 9 and FIG. 10.

FIG. 13 is a flow chart showing packet transmission processing by the virtual machine in the first exemplary embodiment.

FIG. 14 is a flow chart showing packet transmission processing by the management software in the first exemplary embodiment.

FIG. 15 is a flow chart showing packet reception processing by the management software in the first exemplary embodiment.

FIG. 16 is a flow chart showing packet reception processing by the virtual machine in the first exemplary embodiment.

FIG. 17 is a sequence diagram showing invalidation processing in the first exemplary embodiment.

FIG. 18 is a flow chart showing processing by the virtual machine in FIG. 17.

FIG. 19 is a flow chart showing processing by the management software in FIG. 17.

FIG. 20 is a flow chart showing processing by the management software in another invalidation processing.

FIG. 21 is a flow chart showing processing by the virtual machine in another invalidation processing.

FIG. 22 is a flow chart showing cryptography processing according to a second exemplary embodiment of the present invention.

FIG. 23 is a flow chart showing processing of Step S500 in FIG. 22.

FIG. 24 is a flow chart showing processing of Step S520 in FIG. 22.

FIG. 25 is a flow chart showing processing by the virtual machine in the second exemplary embodiment.

FIG. 26 is a block diagram showing a configuration of a computer system according to a third exemplary embodiment of the present invention.

FIG. 27 is a flow chart showing processing by the virtual machine in the third exemplary embodiment.

FIG. 28 is a flow chart showing processing by the management software in the third exemplary embodiment.

FIG. 29 is a block diagram showing a configuration of a computer system according to a fourth exemplary embodiment of the present invention.

DESCRIPTION OF EMBODIMENTS

Figure 1:
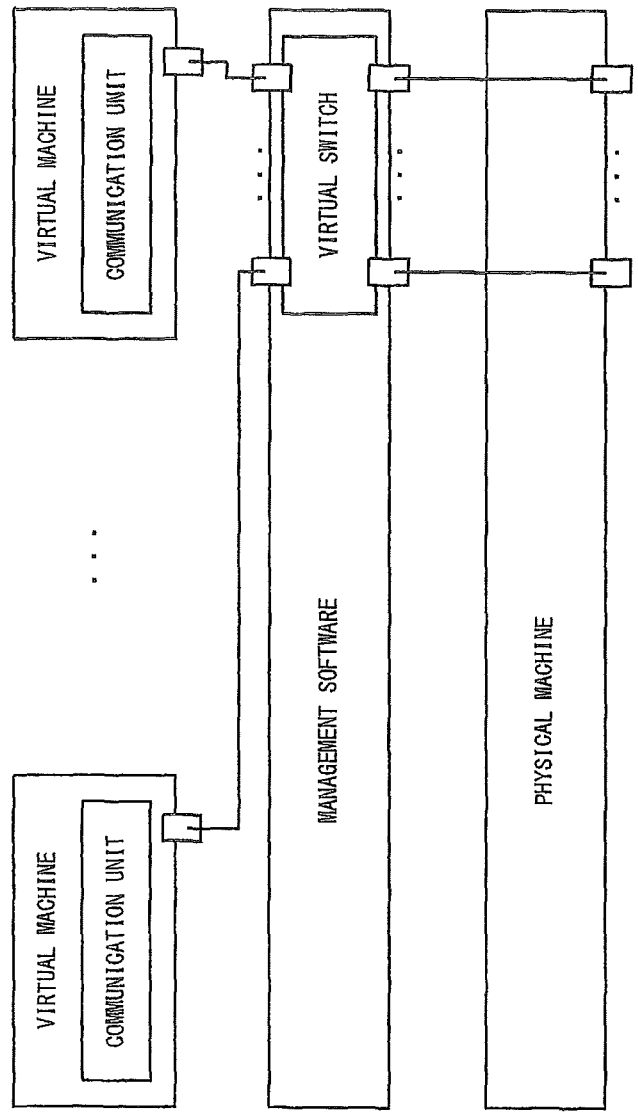
FIG. 1 is a block diagram showing a typical virtual machine environment.
Figure 2:
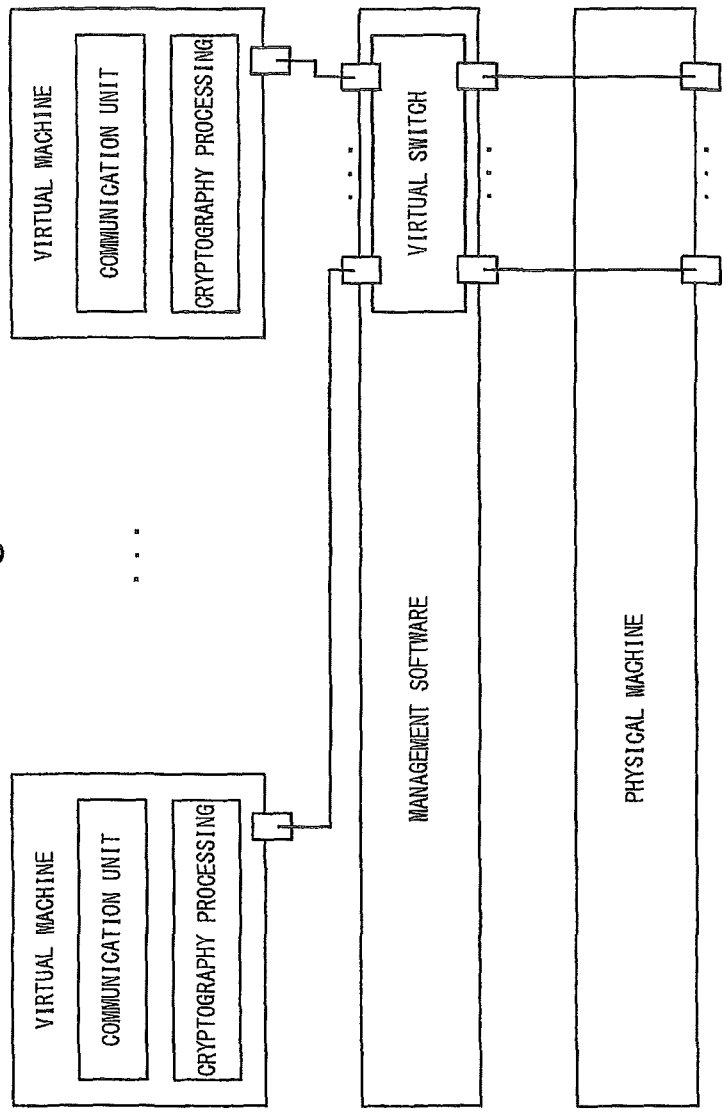
FIG. 2 is a block diagram showing a case where a virtual machine executes cryptography processing in the configuration shown in FIG. 1.
Figure 3:
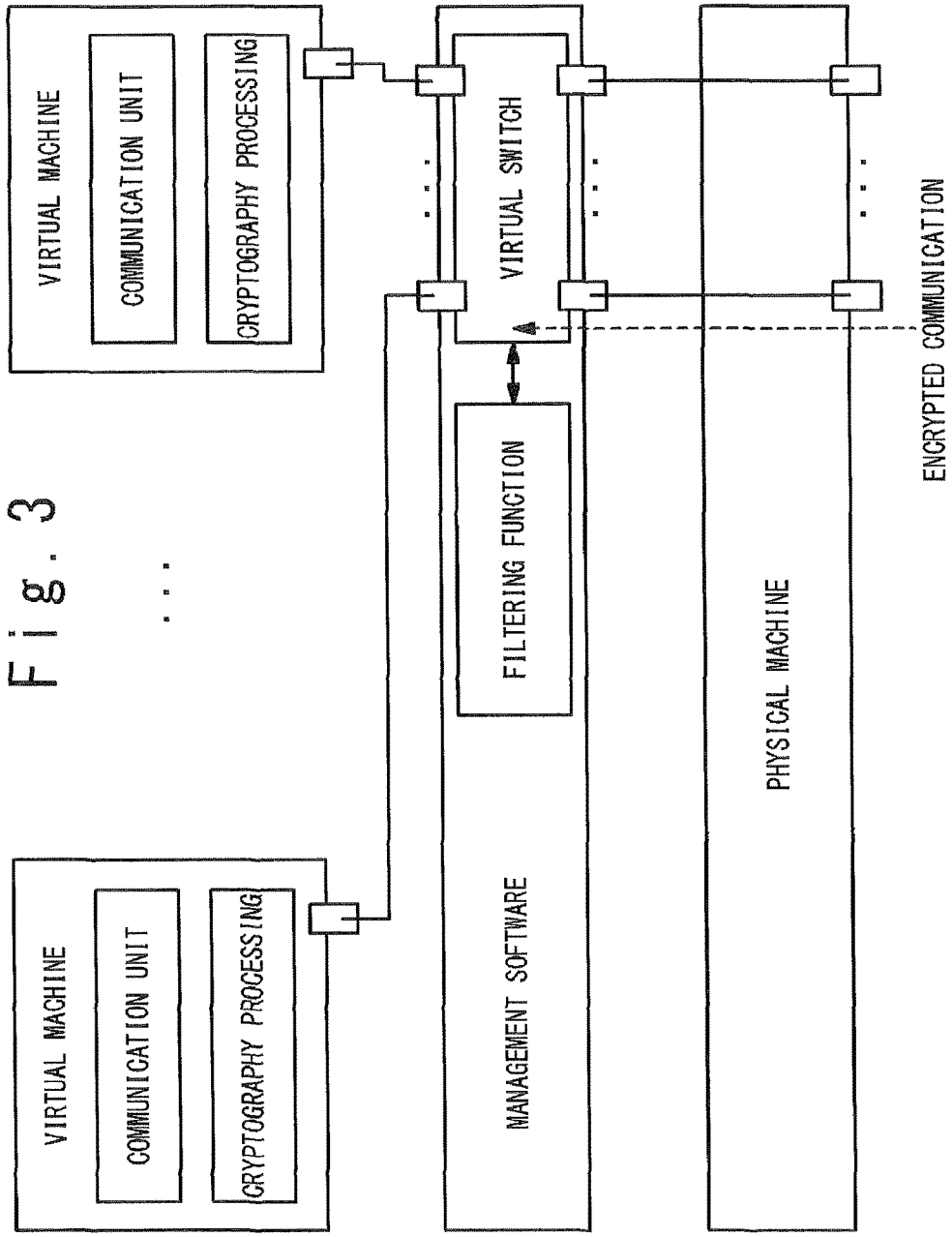
FIG. 3 is a block diagram showing a case where management software has a filtering function in the configuration shown in FIG. 2.

Exemplary embodiments of the present invention will be described with reference to the attached drawings.

First, let us explain a summary. FIG. 6 is a block diagram schematically showing a configuration of a computer system 2 according to an exemplary embodiment of the present invention. The computer system 2 has a physical machine 1, a virtual machine 3 and a management block (management software) 4. It should be noted that, in the following description, a module or a block means a functional unit that is achieved by a computer executing a program.

The virtual machine 3 operates on the physical machine 1. The virtual machine 3 has a communication unit such as a protocol stack for communicating with other virtual machines and the physical machine 1. The communication unit performs the communication through a virtual network interface. Furthermore, the virtual machine 3 has a function of executing specific function processing (e.g. cryptography processing). More specifically, the virtual machine 3 has a specific function processing module 34. The specific function processing module 34 performs specific function processing with respect to packets transmitted and received by the virtual machine 3. Information required for the specific function processing is hereinafter referred to as "processing information INF". In a case of the cryptography processing, for example, the processing information INF includes key information required for the cryptography processing and the like.

The management block (management software) 4 also operates on the physical machine 1. The management block 4 performs management of the virtual machine 3. Moreover, the management block 4 has a virtual switch 41. The virtual switch 41, which is a software-based packet switch, relays communications between the virtual machines 3 and between the virtual machine 3 and the physical machine 1. That is, the virtual switch 41 relays packets transmitted and received by the virtual machine 3.

Moreover, according to the present exemplary embodiment, the virtual switch 41 of the management block 4 also has a function of executing the same processing as the specific function processing executed by the virtual machine 3. More specifically, the virtual switch 41 has an offload processing block 415. The offload processing block 415 is able to perform the same specific function processing as that of the virtual machine 3.

Therefore, according to the present exemplary embodiment, it is possible to offload (or relocate) the specific function processing by the virtual machine 3 to the management block 4, as appropriate. In the case where the specific function processing is offloaded from the virtual machine 3 to the management block 4, the specific function processing module 34 of the virtual machine 3 notifies the management block 4 of the processing information INF. The offload processing block 415 of the virtual switch 41 receives the processing information INF notified from the virtual machine 3. Then, the offload processing block 415 executes the specific function processing based on the received processing information INF.

Figure 4:
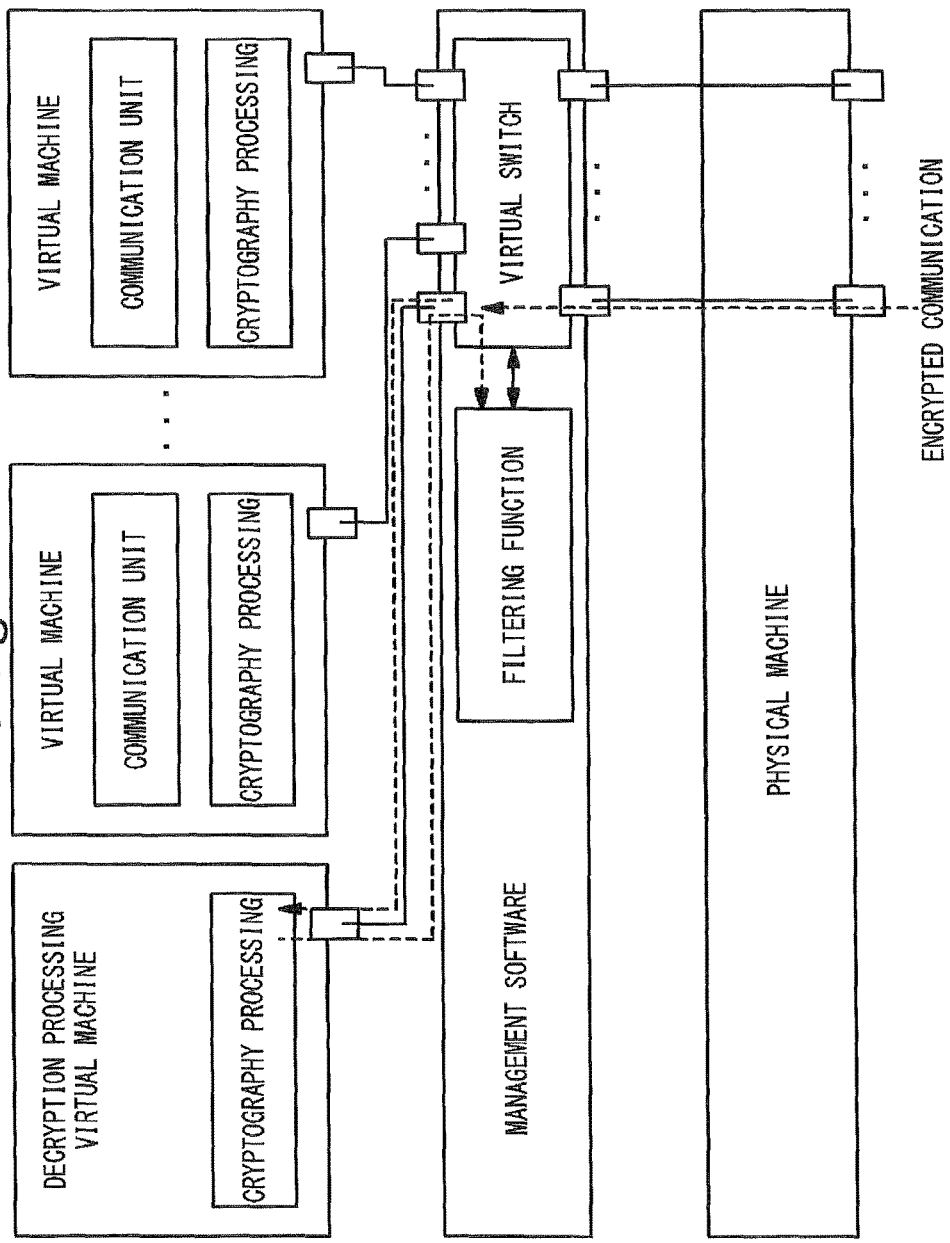
FIG. 4 is a block diagram for explaining filtering processing in the case of the configuration shown in FIG. 3.

In this manner, according to the present exemplary embodiment, the management block 4 is so configured as to be able to execute the specific function processing. It is therefore possible to offload the specific function processing by the virtual machine 3 to the management block 4, as appropriate. As a result, the increase in overhead as shown in FIG. 4 is prevented. That is, according to the present exemplary embodiment, the processing efficiency of the computer system 2 is improved.

Also, the physical machine 1 may have an accelerator 17 (e.g. cryptography processing accelerator) that is able to execute at a high speed the same specific function processing as that of the virtual machine 3. The accelerator 17 may be incorporated into hardware such as an expansion card or may be achieved by a software program. If the accelerator 17 is available, the offload processing block 415 of the virtual switch 41 may execute the specific function processing by utilizing the accelerator 17. Since computational resource of the physical machine 1 can be utilized effectively, the processing efficiency of the computer system 2 is improved.

Figure 5:
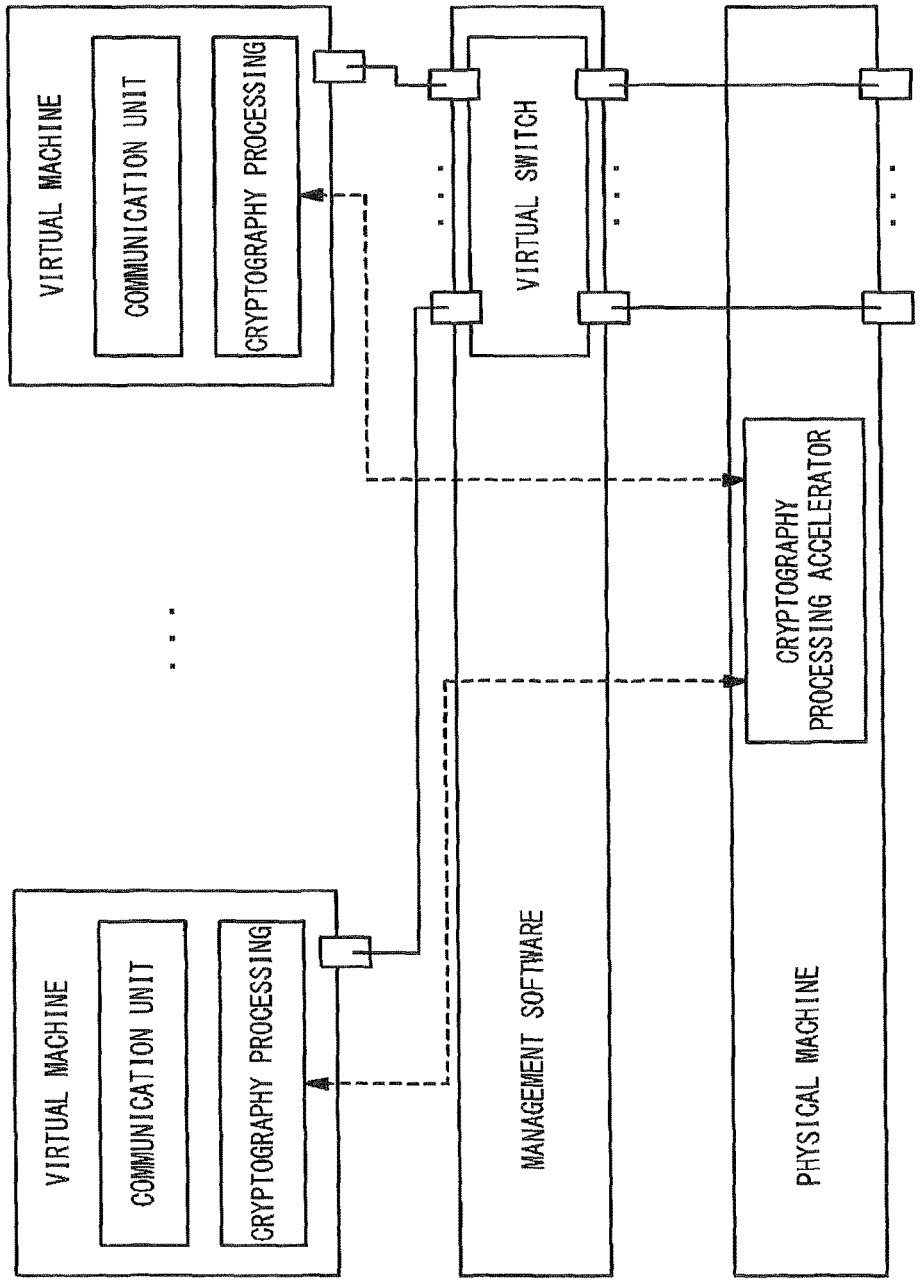
FIG. 5 is a block diagram showing a case where a virtual machine utilizes a cryptography processing accelerator in the configuration shown in FIG. 2.

In the example shown in the foregoing FIG. 5, the virtual machine directly utilizes the cryptography processing accelerator of the physical machine by using an interface different from the virtual network interface. Therefore, a mechanism that performs scheduling between virtual machines and exclusive access control is required. Whereas, according to the present exemplary embodiment, the offload processing block 415 of the virtual switch 41 utilizes the accelerator 17 of the physical machine 1. Therefore, there is no need to perform the scheduling between virtual machines and the exclusive access control.

It should be noted that the computer system 2 according to the present exemplary embodiment is achieved by the physical machine 1 executing a virtualization program (virtualization software). The virtualization program is a computer program executed by the physical machine 1 (computer) and constructs the computer system 2 according to the present exemplary embodiment on the physical machine 1. The virtualization program may be recorded on a tangible computer-readable recording medium.

FIG. 7 is a block diagram schematically showing an example of a hardware configuration of the physical machine 1 (computer). The physical machine 1 has a CPU 11, a memory 12, an I/O controller 13, a disk device 14, a network interface 15 and an accelerator 17. The disk device 14, the network interface 15 and the accelerator 17 are connected to the I/O controller 13. The disk device 14 may be a network disk device connected through the network interface 15. The above-mentioned virtualization program is stored in the memory 12 and the disk device 14 and executed by the CPU 11. Therefore, the virtual machine 3 and the management block 4 has their memory areas in the memory 12 and the disk device 14.

Various exemplary embodiments of the present invention will be hereinafter described in detail.

1. First Exemplary Embodiment

As a first exemplary embodiment, let us describe a case where the above-mentioned specific function processing is "cryptography processing". Here, the term "cryptography processing" includes both encryption processing and decryption processing. The processing information INF required for the cryptography processing is hereinafter referred to as "cryptography processing information INF". The cryptography processing information INF includes such information according to cryptography processing protocol as key information. For example, in a case of SSL, the cryptography processing information INF includes a public key, a secret key and so on.

1-1. Configuration

FIG. 8 is a block diagram showing a configuration of the computer system 2 according to the first exemplary embodiment. The computer system 2 has the physical machine 1, the virtual machine 3 and management software 4 (management block).

The physical machine 1 has a cryptography processing accelerator 16 that is able to perform the cryptography processing at a high speed. The cryptography processing accelerator 16 is equivalent to the accelerator 17 in FIG. 6.

The virtual machine 3 has a communication application 31, a communication processing module 32, a cryptography processing module 33 and one or more virtual network interfaces 36.

The communication application 31 is an application including some sort of communication processing. When executing the communication processing, the communication application 31 requests the communication processing module 32 to perform the communication processing, through an API (Application Program Interface) and a library.

The communication processing module 32 has one or more communication processing blocks (321 and 322 in the example shown in FIG. 8). The communication processing block handles protocol such as TCP (Transmission Control Protocol), UDP (User Datagram Protocol), IP (Internet Protocol). The communication processing module 32 transmits a cryptography processing request and a target data to the cryptography processing module 33. Note that the communication processing module 32 and the cryptography processing module 33 may be the same process or may be different processes.

The cryptography processing module 33 is equivalent to the specific function processing module 34 in FIG. 6. The cryptography processing module 33 has a bypass determination block 331, a cryptography processing block 332 and an information communication block 333.

The bypass determination block 331 determines whether to execute the cryptography processing requested from the communication processing module 32 in the cryptography processing module 33 or to offload it to the management software 4. More specifically, the bypass determination block 331 retains offload availability information in a memory area. The offload availability information associates session information of a communication application with whether or not to offload the communication to the management software 4. The bypass determination block 331 refers to the offload availability information to determine whether or not to offload the cryptography processing to the management software 4.

In a case of executing the cryptography processing in the cryptography processing module 33, the bypass determination block 331 transmits a communication identifier, the cryptography processing information INF and a target data to the cryptography processing block 332. The communication identifier is exemplified by an arbitrary combination of fields (source IP address, destination IP address, source MAC address, destination MAC address and the like) included in a packet header. On the other hand, in a case of offloading the cryptography processing to the management software 4, the bypass determination block 331 passes the communication identifier and the cryptography processing information INF to the information communication block 333 and returns the target data without change to the communication processing module 32.

The cryptography processing block 332 executes the cryptography processing. More specifically, the cryptography processing block 332 stores the communication identifier and the cryptography processing information INF received from the bypass determination block 331 in a memory area. Then, in response to a request from the bypass determination block 331, the cryptography processing block 332 executes the cryptography processing with respect to the received target data by using the appropriate cryptography processing information INF. A data obtained as a result of the cryptography processing is transmitted to the communication processing module 32.

The information communication block 333 forwards information received from the bypass determination block 331 to the management software 4. Also, the information communication block 333 forwards information received from the management software 4 to the bypass determination block 331.

A communication data handled by the communication processing module 32 is processed to be a packet and transmitted through the virtual network interface 36 to the virtual switch 41. In the case where the cryptography processing is offloaded, a data section of the packet transmitted from the virtual machine 3 to the virtual switch 41 is a plain text. A data size may vary depending on the cryptography processing protocol. Therefore, when processing the communication data to be a packet, the communication processing module 32 beforehand ensures an area to be used by the cryptography processing protocol in the data section of the packet.

The management software 4 has the virtual switch 41, an information communication block 42, a physical machine information management block 43 and an offloading determination block 44.

The virtual switch 41 manages connection between the virtual network interface 36 of each virtual machine 3 and a physical network interface 15 of the physical machine 1. The virtual network interface 36 and the virtual switch 41 are connected through a virtual switch port 414. Moreover, the physical network interface 15 and the virtual switch 41 are connected through a virtual switch port 414. The virtual switch 41 has a packet processing block 411 and an offload processing block 412.

The packet processing block 411 has a packet forwarding function. That is, the packet processing block 411 determines a destination of a packet received from the virtual switch port 414 and forwards the packet to the destination. Furthermore, the packet processing block 411 has a packet filtering function as well and executes filtering based on information in an arbitrary region in the packet. Rules of the filtering are transmitted from the virtual machine 3 through the information communication block 42.

Moreover, the packet processing block 411 determines whether or not the cryptography processing is necessary for a received packet. More specifically, the packet processing block 411 retains cryptography processing necessity information in a memory area. The cryptography processing necessity information associates the communication identifier with whether or not to perform the cryptography processing with respect to a packet matching the communication identifier. The cryptography processing necessity information is transmitted from the virtual machine 3 requesting the cryptography processing through the information communication block 42. The packet processing block 411 refers to the cryptography processing necessity information to determine whether or not the cryptography processing is necessary for the received packet. In a case where the cryptography processing is necessary, the packet processing block 411 passes the packet to the offload processing block 412 and requests the cryptography processing.

The offload processing block 412 is equivalent to the offload processing block 415 in FIG. 6 and performs the cryptography processing with respect to a target communication whose offloading is permitted. More specifically, the offload processing block 412 retains offload processing information in a memory area. The offload processing information associates the communication identifier with the cryptography processing information INF regarding the communication. The offload processing information is transmitted from the virtual machine 3 requesting the cryptography processing through the information communication block 42. The offload processing block 412 refers to the offload processing information to execute the cryptography processing with respect to a received packet. It should be noted that the offload processing block 412 may perform the cryptography processing by itself or may perform the cryptography processing by utilizing the cryptography processing accelerator 16 of the physical machine 1. In the case of utilizing the cryptography processing accelerator 16, the offload processing block 412 passes the cryptography processing information INF and the target packet to the cryptography processing accelerator 16.

The information communication block 42 communicates information with the virtual machine 3.

The physical machine information management block 43 retains information on the physical machine 1. The information is exemplified by information on a cryptography processing function of the cryptography processing accelerator 16. In general, the management software 4 acquires information on a CPU, a memory capacity, a disk capacity, an I/O function of the physical machine 1, and such information may be used.

The offloading determination block 44 determines whether or not to execute the cryptography processing requested from the virtual machine 3 on a side of the management software 4. In other words, the offloading determination block 44 determines whether or not to permit the offloading of the cryptography processing from the virtual machine 3 to the management software 4. A criterion for determining is exemplified by whether or not the requested cryptography processing protocol can be handled by the function of the cryptography processing accelerator 16. Such information on the physical machine 1 can be extracted from the physical machine information management block 43. Another criterion for determining is exemplified by whether or not a virtual machine 3 issuing the offload request or a user using the virtual machine 3 has authority to utilize the cryptography processing accelerator 16. Moreover, the number of communication sessions currently being the target of the cryptography processing can be used as a criterion for determining.

1-2. Processing Flow

Next, a processing flow by the computer system 2 according to the present exemplary embodiment will be described.

1-2-1. Offload Request Processing, Offload Preparation Processing

FIG. 9 is a sequence diagram showing offload request processing when starting a cryptographic communication.

Step S100:

First, the cryptography processing module 33 of the virtual machine 3 as a request source transmits to the management software 4 an offload request for offloading the cryptography processing regarding a target communication. Here, the cryptography processing module 33 notifies the management software 4 of what kind of cryptography processing protocol regarding what kind of communication is desired to be offloaded. The cryptography processing protocol is exemplified by SSL or IPsec (Security Architecture for Internet Protocol).

Step S110:

The management software 4 receives the offload request through the information communication block 42. In response to the offload request, the offloading determination block 44 determines whether or not to permit offloading of the cryptography processing regarding the target communication. The criterion for determining is as mentioned above. Then, the management software 4 transmits determination result information indicating the determination result to the virtual machine 3 as the request source.

Step S120:

The virtual machine 3 as the request source receives the determination result information from the management software 4 through the information communication block 333. The bypass determination block 331 stores the determination result information as the above-mentioned offload availability information in a memory area.

FIG. 10 is a sequence diagram showing offload preparation processing in a case where the offloading is permitted.

Step S140:

The cryptography processing module 33 of the virtual machine 3 as the request source notifies the management software 4 of the communication identifier and the cryptography processing information INF regarding the target communication, through the information communication block 333. For example, in a case where the cryptography processing protocol is SSL, the cryptography processing information INF includes a server key used for encrypting a data for transmission and a client key used for decrypting a received data.

Step S150:

The virtual switch 41 of the management software 4 receives the communication identifier and the cryptography processing information INF through the information communication block 42. The virtual switch 41 stores the received information as the above-mentioned cryptography processing necessity information and offload processing information in a memory area.

Step S160:

After the Step S150 is completed, the management software 4 transmits a preparation completion notification to the virtual machine 3 as the request source through the information communication block 42.

The processing shown in FIG. 9 and FIG. 10 can be executed at various timings. The timings are exemplified by a time of start-up of the virtual machine 3, a time of start-up of the communication application 31, a time when the communication application 31 initiates a new communication, a time when data belonging to the cryptography processing target communication begin to flow, and so forth. For example, in a case of IPsec where the cryptography processing can be applied to whole communication instead of a specific application, the time of start-up of the virtual machine 3 can be considered as the timing. Also for example, in a case of SSL where the cryptography processing is executed on an application basis, the time of start-up of the communication application 31 can be considered as the timing.

FIG. 11 is a flow chart showing the processing by the virtual machine 3 in FIG. 9 and FIG. 10. It should be noted that the same reference numerals are given to the same processing as those described in FIG. 9 and FIG. 10.

The cryptography processing module 33 of the virtual machine 3 transmits the offload request to the management software 4 (Step S100). If the determination result information is notified from the management software 4 (Step S115; Yes), the bypass determination block 331 stores the determination result information as the offload availability information in a memory area (Step S120).

A method for determining whether or not the determination result is notified is exemplified by (A) outputting from the management software 4 to the virtual machine 3 a signal indicating that the determination result has been notified, or (B) writing, by the management software 4, a data indicating that the determination result has been notified in a specific region in a memory area of the virtual machine 3 and polling, by the virtual machine 3, the memory area. The method for determining is applicable to other notification determination processing.

Next, the cryptography processing module 33 refers to the received determination result information to determine whether or not the cryptography processing regarding the target communication can be offloaded (Step S130). If the offloading is not possible (Step S130; No), the processing flow shown in FIG. 11 is completed. On the other hand, if the offloading is possible (Step S130; Yes), the cryptography processing module 33 notifies the management software 4 of the communication identifier and the cryptography processing information INF regarding the target communication, through the information communication block 333 (Step S140).

After that, the cryptography processing module 33 waits for the preparation completion notification from the management software 4 (Step S165). When the cryptography processing module 33 receives the preparation completion notification (Step S165; Yes), the processing flow shown in FIG. 11 is completed.

FIG. 12 is a flow chart showing the processing by the management software 4 in FIG. 9 and FIG. 10. It should be noted that the same reference numerals are given to the same processing as those described in FIG. 9 and FIG. 10.

The management software 4 receives the offload request from the virtual machine 3 through the information communication block 42 (Step S105; Yes). In response to the offload request, the management software 4 determines whether or not to permit the offloading of the cryptography processing regarding the target communication and transmits the determination result information to the virtual machine 3 as the request source (Step S110).

If the offloading is impossible (Step S135; No), the processing flow shown in FIG. 12 is completed. On the other hand, if the offloading is possible (Step S135; Yes), the management software 4 waits for provision of information from the virtual machine 3 (Step S145). When receiving the communication identifier and the cryptography processing information INF from the virtual machine 3 (Step S145; Yes), the management software 4 stores the received information in a memory area (Step S150), After that, the management software 4 transmits the preparation completion notification to the virtual machine 3 as the request source (Step S160).

1-2-2. Packet Transmission Processing

FIG. 13 is a flow chart showing packet transmission processing by the virtual machine 3. First, the communication application 31 operating on the virtual machine 3 calls for the communication processing module 32 by using the communication API and library to initiate a communication (Step S200). Let us consider a case where the communication data is a target of encryption. For the purpose of the cryptography processing, the communication data is transferred to the bypass determination block 331 of the cryptography processing module 33 through the communication processing module 32.

Next, the bypass determination block 331 determines whether or not to offload the cryptography processing regarding the communication data to the management software 4, by referring to the offload availability information stored in the memory area (Step S220). If the offloading is possible (Step S220; Yes), the bypass determination block 331 returns the received communication data as a plain text without change back to the communication processing module 32. Then, the communication processing module 32 packetize the communication data and transmits the packet to the virtual switch 41 through the virtual network interface 36 (Step S230).

On the other hand, if the offloading is not possible (Step S220; No), the bypass determination block 331 passes the communication data to the cryptography processing block 332. Then, the cryptography processing block 332 executes the cryptography processing with respect to the communication data (Step S225). The cryptography processing block 332 transmits the encrypted data to the communication processing module 32. The communication processing module 32 packetize the received data and transmits the packet to the virtual switch 41 through the virtual network interface 36 (Step S235).

FIG. 14 is a flow chart showing packet transmission processing by the management software 4. First, the packet processing block 411 of the virtual switch 41 receives a packet from the virtual machine 3 through the virtual switch port 414. The packet processing block 411 extracts communication identifying information included in a header of the received packet. Then, the packet processing block 411 refers to the cryptography processing necessity information stored in the memory area to determine whether or not to perform encryption of the received packet (Step S240).

Alternatively, the Step S240 may be performed as follows. When creating a packet, the communication processing module 32 writes a data indicating to execute the cryptography processing, in a specific region in the packet. Based on contents of the specific region, the packet processing block 411 determines whether or not to execute the encryption. The specific region in a packet is exemplified by an unused region in the packet header, a region of leading several bytes in a data section of the packet, and so on. Which region is to be used depends on the communication application 31. Therefore, at the Step S140 in FIG. 10, information designating the specific region is notified as well.

If it is determined to execute the encryption (Step S240; Yes), the packet processing block 411 passes the packet to the offload processing block 412 and requests the encryption. The offload processing block 412 executes the encryption with respect to the received packet, by referring to the cryptography processing information INF regarding the target communication stored in the memory area (Step S250). It should be noted that the encryption may be performed by using the cryptography processing accelerator 16 or may be performed by the offload processing block 412 itself. The encrypted packet is transmitted to the packet processing block 411.

If the encryption is not performed (Step S240; No), the Step S250 is skipped.

After that, the packet processing block 411 transmits the packet to the destination through an appropriate virtual switch port 414 (Step S260).

1-2-3. Packet Reception Processing

FIG. 15 is a flow chart showing external packet reception processing by the management software 4. First, the packet processing block 411 refers to the cryptography processing necessity information stored in the memory area to determine whether or not to perform decryption of the received encrypted packet (Step S300).

If it is determined to execute the decryption (Step S300; Yes), the packet processing block 411 passes the packet to the offload processing block 412 and requests the decryption. The offload processing block 412 executes the decryption with respect to the received packet, by referring to the cryptography processing information INF regarding the target communication stored in the memory area (Step S310). It should be noted that the decryption may be performed by using the cryptography processing accelerator 16 or may be performed by the offload processing block 412 it self. The decrypted packet is transmitted to the packet processing block 411.

If the decryption is not performed (Step S300; No), the Step S310 is skipped.

After that, the packet processing block 411 performs the filtering processing with respect to the packet. If the cryptography processing is offloaded, namely, if the decryption is executed in the virtual switch 4, efficient filtering depending on the packet data of the packet is possible. After that, the packet processing block 411 forwards the packet to an appropriate virtual machine 3 through the virtual switch port 414 (Step S320).

FIG. 16 is a flow chart showing packet reception processing by the virtual machine 3. First, the virtual machine 3 receives a packet from the virtual switch 4 through the virtual network interface 36. The bypass determination block 331 determines whether or not to execute the decryption of the packet, by referring to the offload availability information stored in the memory area (Step S330).

If the cryptography processing regarding the packet is not offloaded, the decryption is performed in the virtual machine 3 (Step S330; Yes). In this case, the bypass determination block 331 passes the packet to the cryptography processing block 332. Then, the cryptography processing block 332 performs the decryption with respect to the packet (Step S340). The cryptography processing block 332 transmits the decrypted data to the communication processing module 32.

If the cryptography processing regarding the packet is offloaded, there is no need to perform the decryption in the virtual machine 3 (Step S330; No). In this case, the Step S340 is skipped.

After that, the communication processing module 32 processes the packet to be a data used in the communication application 31 and passes the data to the communication application 31 (Step S350).

1-2-4. Invalidation Processing

FIG. 17 is a sequence diagram showing an example of invalidation processing when a communication being a target of the cryptography processing is ended. Note that "communication being ended" means that, for example in a case of communication using the TCP, transmission and reception of a FIN packet is completed.

In the present example, the virtual machine 3 detects that a communication being a target of the cryptography processing is ended and then explicitly initiates invalidation processing. First, the cryptography processing module 33 invalidates information (offload availability information and cryptography processing information INF) regarding the cryptography processing for the target communication stored in the memory area (Step S400). Further, the cryptography processing module 33 transmits an invalidation request for invalidating the information regarding the cryptography processing for the target communication, to the management software 4 through the information communication block 333 (Step S410).

The virtual switch 41 of the management software 4 receives the invalidation request through the information communication block 42. In response to the invalidation request, the virtual switch 41 invalidates the information (cryptography processing necessity information and cryptography processing information INF) regarding the cryptography processing for the target communication stored in the memory area (Step S420). After that, the management software 4 notifies the virtual machine 3 of a fact that the invalidation processing in response to the received invalidation request is completed, through the information communication block 42 (Step S430).

FIG. 18 is a flow chart showing the processing by the virtual machine 3 in FIG. 17. It should be noted that the same reference numerals are given to the same processing as those described in FIG. 17.

First, the cryptography processing module 33 invalidates information (offload availability information and cryptography processing information INF) regarding the cryptography processing for the target communication stored in the memory area (Step S400). Further, the cryptography processing module 33 transmits the invalidation request for invalidating the information regarding the cryptography processing for the target communication, to the management software 4 (Step S410). After that, the virtual machine 3 waits for the invalidation completion notification from the management software 4 (Step S435). When the cryptography processing module 33 receives the invalidation completion notification (Step S435; Yes), the processing flow shown in FIG. 18 is completed.

FIG. 19 is a flow chart showing the processing by the management software 4 in FIG. 17. It should be noted that the same reference numerals are given to the same processing as those described in FIG. 17.

The management software 4 receives the invalidation request from the virtual machine 3 (Step S415; Yes). In response to the invalidation request, the virtual switch 41 invalidates the information (cryptography processing necessity information and cryptography processing information INF) regarding the cryptography processing for the target communication stored in the memory area (Step S420). After that, the management software 4 transmits the invalidation completion notification to the virtual machine 3 (Step S430).

Let us describe another example of the invalidation processing. In this example, if packets of a communication being a target of the cryptography processing do not flow for a given period of time, the management software 4 side initiates invalidation processing. FIG. 20 is a flow chart showing processing by the management software 4, and FIG. 21 is a flow chart showing processing by the virtual machine 3.

First, the management software 4 determines whether or not there exists any communication being a target of the cryptography processing wherein no packet is transmitted and received for a given period of time (Step S450). If there exists no such communication (Step S450; No), the processing flow shown in FIG. 20 is completed. On the other hand, if there exists any such communication (Step S450; Yes), the virtual switch 41 invalidates the information (cryptography processing necessity information and cryptography processing information INF) regarding the cryptography processing for the target communication stored in the memory area (Step S460). After that, the management software 4 transmits an invalidation notification regarding the target communication to the virtual machine 3 through the information communication block 42 (Step S470). It should be noted that the processing shown in FIG. 20 is executed repeatedly at a predetermined time interval.

The virtual machine 3 receives the invalidation notification from the management software 4 through the information communication block 333 (Step S475; Yes). In response to the invalidation notification, the cryptography processing module 33 invalidates the offload availability information regarding the target communication. For example, the cryptography processing module 33 records on a memory area a fact that no offloading setting regarding the target communication is done in the management software 4 (Step S480). If data of the target communication starts flowing again, the setting processing shown in FIG. 9 and FIG. 10 is executed again, and the cryptography processing is resumed.

1-3. Effects

According to the present exemplary embodiment, as described above, the management software 4 is so configured as to be able to execute the cryptography processing. It is therefore possible to offload the cryptography processing by the virtual machine 3 to the management software 4, as appropriate. As a result, the increase in overhead as shown in FIG. 4 is prevented. That is, according to the present exemplary embodiment, the processing efficiency of the computer system 2 is improved.

Moreover, even in a case of an encrypted communication where a data section of a packet is encrypted, efficient filtering processing depending on the data section is possible, because the cryptography processing is possible within the virtual switch 41 of the management software 4.

Furthermore, according to the present exemplary embodiment, the virtual switch 41 of the management software 4 utilizes the cryptography processing accelerator 16 of the physical machine 1. Therefore, there is no need to perform the scheduling between virtual machines 3 and the exclusive access control.

2. Second Exemplary Embodiment

Since the memory areas respectively allocated to the packet processing block 411 and the offload processing block 412 of the management software 4 are finite, there is a limit to the number of entries that can be ensured. It is therefore desirable that the packet processing block 411 and the offload processing block 412 respectively utilize the allocated memory areas like a cache memory of a CPU. Such a case will be described in a second exemplary embodiment of the present invention. It should be noted that an overlapping description with the first exemplary embodiment will be omitted as appropriate. Let us consider a case where the information regarding the cryptography processing can be treated on a cryptography processing basis and an entry is ensured with respect to each cryptography processing.

FIG. 22 is a flow chart showing the cryptography processing according to the present exemplary embodiment. The virtual switch 41 of the management software 4 receives a packet. Then, the packet processing block 411 refers to the allocated memory area (Step S500).

FIG. 23 is a flow chart showing processing of the Step S500. First, the packet processing block 411 determines where or not there exists a hit entry that matches the received packet (Step S5000). Here, the hit entry is an entry that indicates the cryptography processing necessity information regarding the received packet. If there exists the hit entry (Step S5000; Yes), the processing flow shown in FIG. 23 is completed. On the other hand, if no hit entry exists (Step S5000; No), the packet processing block 411 inquires of the source virtual machine 3 for processing contents, based on header information of the packet (Step S5010). When the processing contents regarding the packet is notified from the virtual machine 3 (Step S5020; Yes), the packet processing block 411 determines whether or not an available space exists in the allocated memory area (Step S5030). If there exists an available space (Step S5030; Yes), the packet processing block 411 stores the information received from the virtual machine 3 as the hit entry in the memory area (Step S5040). On the other hand, if there is no available space (Step S5030; No), the packet processing block 411 performs entry replacement (Step S5045). The entry replacement is similar to entry replacement control in a cache memory generally used in a CPU, and a detailed description of which is omitted here.

Referring back to FIG. 22 again, the packet processing block 411 refers to the above-mentioned hit entry (cryptography processing necessity information) to determine whether or not to perform the cryptography processing with respect to the received packet (Step S510). If the cryptography processing is not performed (Step S510; No), the processing proceeds to Step S540 which will be described later. On the other hand, if it is determined to perform the cryptography processing (Step S510; Yes), the packet processing block 411 passes the packet to the offload processing block 412, and requests the cryptography processing. The offload processing block 412 refers to the allocated memory area (Step S520).

FIG. 24 is a flow chart showing processing of the Step S520. First, the offload processing block 412 determines where or not there exists a hit entry that matches the received packet (Step S5200). Here, the hit entry is an entry that indicates the offload processing information (cryptography processing information INF) regarding the received packet. If there exists the hit entry (Step S5200; Yes), the processing flow shown in FIG. 24 is completed. On the other hand, if no hit entry exists (Step S5200; No), the offload processing block 412 inquires of the source virtual machine 3 for processing contents, based on header information of the packet (Step S5210). When the processing contents regarding the packet is notified from the virtual machine 3 (Step S5220; Yes), the offload processing block 412 determines whether or not an available space exists in the allocated memory area (Step S5230). If there exists an available space (Step S5230; Yes), the offload processing block 412 stores the information received from the virtual machine 3 as the hit entry in the memory area (Step S5240). On the other hand, if there is no available space (Step S5230; No), the offload processing block 412 performs entry replacement (Step S5245). The entry replacement is similar to entry replacement control in a cache memory generally used in a CPU, and a detailed description of which is omitted here.

Referring back to FIG. 22 again, the offload processing block 412 refers to the above-mentioned hit entry (offload processing information, cryptography processing information INF) to execute the cryptography processing with respect to the received packet (Step S530). It should be noted that the cryptography processing may be performed by utilizing the cryptography processing accelerator 16 or may be performed by the offload processing block 412 itself. The packet after the processing is transferred to the packet processing block 411.

The packet processing block 411 transmits the packet to the destination through an appropriate virtual switch port 414 (Step S540).

FIG. 25 is a flow chart showing the processing by the virtual machine 3. When receiving the inquiry from the management software 4, the cryptography processing module 33 of the virtual machine 3 refers to the memory area of the bypass determination block 331 and transmits information depending on the inquiry contents to the management software 4 (Step S550).

It should be noted in the present exemplary embodiment, if an entry is eliminated from the memory area due to the entry replacement, the eliminated entry may be written in another memory device such as a disk device to which the management software 4 can access. By reading out the entry as necessary, the management software 4 needs not to inquire of the virtual machine 3.

According to the present exemplary embodiment, the same effects as in the case of the first exemplary embodiment can be obtained. Furthermore, since the allocated memory area is used like a cache memory, it is possible to execute the offload processing with respect to communications whose number is more than the maximum number of entries.

3. Third Exemplary Embodiment

FIG. 26 is a block diagram showing a configuration of the computer system 2 according to a third exemplary embodiment. An overlapping description with the first exemplary embodiment will be omitted as appropriate. According to the present exemplary embodiment, whether or not to offload the cryptography processing is determined based on policy. For that purpose, the virtual machine 3 further has a policy management block 334. Moreover, the management software 4 further has a policy management block 45.

The policy management block 334 is provided in each virtual machine 3 so as to be referable from the bypass determination block 331. The policy management block 334 manages policies such as which cryptography processing protocol of which communication should be offloaded to the management software 4. A format of the policy information is exemplified by one indicating where to execute the cryptography processing with respect to each cryptography processing protocol. Alternatively, the communication identifying information (communication protocol, IP address etc.) may be associated with where to execute the cryptography processing. The policy management block 334 provides a user or a manager of the virtual machine 3 with an interface for policy setting. The user or the manager of the virtual machine 3 can set the policy by using the interface. For example, the interface is achieved by using software such as a Web browser that provides GUI (Graphical User Interface).

FIG. 27 is a flow chart showing processing by the virtual machine 3. First, the bypass determination block 331 refers to the policy managed by the policy management block 334, based on information on a communication being a target of the cryptography processing (Step S700). If the cryptography processing is executed by the management software 4, namely, the offloading is performed (Step S710; Yes), the above-described Steps S100 to S165 are executed (Step S720). On the other hand, if the cryptography processing is executed within the virtual machine 3, namely, the offloading is not performed (Step S710; No), the bypass determination block 331 passes the cryptography processing information INF and the like to the cryptography processing block 332 and requests the cryptography processing (Step S725).

The policy management block 45 is provided in the management software 4 so as to be referable from the offloading determination block 44. The policy management block 45 manages policies such as whether or not to permit the offloading of the cryptography processing and whether or not to use the cryptography processing accelerator 16 if permitted. The policy information is exemplified by a list of cryptography processing protocols that can be handled by the management software 4 side, the number of communication sessions that can be offloaded with respect to each virtual machine 3 and authority of a user using the virtual machine 3. The policy management block 45 provides a user having appropriate authority such as an operator of the management software 4 with an interface for policy setting. A user having authority can set the policy by using the interface. For example, the interface is achieved by using software such as a Web browser that provides GUI (Graphical User Interface).

FIG. 28 is a flow chart showing processing by the management software 4. Regarding the cryptography processing indicated by the offload request received from the virtual machine 3, the offloading determination block 44 refers to the policy managed by the policy management block 45, based on the cryptography processing protocol and information on the virtual machine 3 (Step S800). Then, the offloading determination block 44 determines whether or not to permit the offloading of the cryptography processing regarding the target communication, and transmits the determination result information to the virtual machine 3 as the request source (Step S810).

According to the present exemplary embodiment, the same effects as in the cases of the foregoing exemplary embodiment can be obtained. Furthermore, since allocation of the cryptography processing based on policy is possible, the allocation of the cryptography processing can be performed flexibly.

4. Fourth Exemplary Embodiment

The present invention is not limited to the offloading of the cryptography processing but is applicable to offloading of specific function processing by the virtual machine 3. FIG. 29 shows a more generalized configuration of the computer system 2. An overlapping description with the foregoing exemplary embodiments will be omitted as appropriate.

A specific function processing module 34 of the virtual machine 3 is similar to the cryptography processing module 33 in the foregoing exemplary embodiments. The specific function processing module 34 includes a bypass determination block 335, a specific function processing block 336 and an information communication block 337. The bypass determination block 335 is similar to the bypass determination block 331 in the foregoing exemplary embodiments. The specific function processing block 336 is similar to the cryptography processing block 332 in the foregoing exemplary embodiments, and executes the specific function processing. The information communication block 337 is similar to the information communication block 333 in the foregoing exemplary embodiments.

The virtual switch 41 of the management software 4 has the packet processing block 411 and an offload processing block 415. The offload processing block 415 is similar to the offload processing block 412 in the foregoing exemplary embodiments, and executes the specific function processing if the offloading is permitted.

An accelerator 17 of the physical machine 1 is similar to the cryptography processing accelerator 16 in the foregoing exemplary embodiments, and is able to execute the specific function processing at a high speed.

The specific function processing is not limited to the cryptography processing. For example, regular expression search in a security system such as an anti-virus system and an anti-spam mail system also is an example of the specific function processing.

While the exemplary embodiments of the present invention have been described above with reference to the attached drawings, the present invention is not limited to these exemplary embodiments and can be modified as appropriate by those skilled in the art without departing from the spirit and scope of the present invention.

While a part of or whole of the above-described exemplary embodiments may be described as the following Supplementary notes, it is not limited to that.

Supplementary Note 1

A computer system comprising:
a virtual machine operating on a physical machine; and
a management block operating on said physical machine and managing said virtual machine,
wherein said virtual machine comprises a specific function processing module configured to perform specific function processing with respect to a packet for transmission and a received packet,
wherein said management block comprises a virtual switch configured to relay a packet transmitted and received by said virtual machine,
wherein said virtual switch comprises an offload processing block configured to perform said specific function processing if said specific function processing is offloaded to said management block, and
wherein if said specific function processing is offloaded from said virtual machine to said management block, said specific function processing module notifies said management block of processing information required for said specific function processing, and said offload processing block executes said specific function processing based on said processing information received from said virtual machine.

Supplementary Note 2

The computer system according to Supplementary note 1,
wherein said physical machine comprises an accelerator for said specific function processing, and
said offload processing block executes said specific function processing by utilizing said accelerator.

Supplementary Note 3

The computer system according to Supplementary note 1 or 2,
wherein said specific function processing module transmits an offload request regarding a first communication to said management block,
wherein in response to said offload request, said management block determines whether or not to permit offloading regarding said first communication and notifies said virtual machine of determination result information indicating the determination result,
wherein if offloading regarding said first communication is permitted, said specific function processing module notifies said management block of said processing information regarding said first communication,
wherein when receiving said processing information, said virtual switch stores said received processing information in a first memory area;
wherein after storing of said processing information in said first memory area is completed, said management block transmits a preparation completion notification to said virtual machine,
wherein after receiving said preparation completion notification, said virtual machine transmits a packet of said first communication to said virtual switch without performing said specific function processing with respect to the packet of said first communication,
wherein said virtual switch receives the packet of said first communication from said virtual machine, and
said offload processing block executes said specific function processing with respect to the packet of said first communication based on said processing information regarding said first communication stored in said first memory area.

Supplementary Note 4

The computer system according to Supplementary note 3,
wherein said specific function processing module stores said determination result information as offload availability information in a second memory area, and
said specific function processing module determines whether or not to perform offloading regarding said first communication by referring to said offload availability information stored in said second memory area.

Supplementary Note 5

The computer system according to Supplementary note 4,
wherein if said first communication is ended, said specific function processing module invalidates said determination result information regarding said first communication and transmits an invalidation request to said management block, and
wherein in response to said invalidation request, said virtual switch invalidates said processing information regarding said first communication stored in said first memory area.

Supplementary Note 6

The computer system according to Supplementary note 4 or 5,
wherein if a packet of said first communication is neither transmitted nor received for a given period of time, said virtual switch invalidates said processing information regarding said first communication stored in said first memory area and transmits an invalidation notification to said virtual machine, and
wherein in response to said invalidation notification, said specific function processing module invalidates said offload availability information regarding said first communication.

Supplementary Note 7

The computer system according to any one of Supplementary notes 1 to 6,
wherein said specific function processing is cryptography processing, and
said specific function processing module is a cryptography processing module configured to perform said cryptography processing.

Supplementary Note 8

The computer system according to Supplementary note 7,
wherein said virtual switch receives an encrypted communication, and
wherein if said cryptography processing is offloaded to said management block, said offload processing block decrypts a packet of said encrypted communication by referring to said processing information and performs filtering depending on the packet data.

Supplementary Note 9

An offloading method in a computer system,
wherein said computer system comprises:
a virtual machine operating on a physical machine; and
a management block operating on said physical machine and managing said virtual machine,
wherein said virtual machine comprises a function of performing specific function processing with respect to a packet for transmission and a received packet,
wherein said management block comprises a virtual switch configured to relay a packet transmitted and received by said virtual machine,
wherein said offloading method comprises:
providing said virtual switch with an offload processing block that performs said specific function processing;
notifying said management block of processing information required for said specific function processing, if said specific function processing is offloaded from said virtual machine to said management block; and
executing, by said offload processing block, said specific function processing based on said processing information.

Supplementary Note 10

A program recorded on a tangible computer-readable medium that, when executed by a physical machine, constructs a computer system on said physical machine,
wherein said computer system comprises:
a virtual machine operating on a physical machine; and
a management block operating on said physical machine and managing said virtual machine,
wherein said virtual machine comprises a specific function processing module configured to perform specific function processing with respect to a packet for transmission and a received packet,
wherein said management block comprises a virtual switch configured to relay a packet transmitted and received by said virtual machine,
wherein said virtual switch comprises an offload processing block configured to perform said specific function processing if said specific function processing is offloaded to said management block, and
wherein if said specific function processing is offloaded from said virtual machine to said management block, said specific function processing module notifies said management block of processing information required for said specific function processing, and said offload processing block executes said specific function processing based on said processing information received from said virtual machine.

This application is based upon and claims the benefit of priority from Japanese patent application No. 2010-164242, filed on Jul. 21, 2010, the disclosure of which is incorporated herein in its entirely by reference.

EXPLANATION OF REFERENCE NUMERALS 1 physical machine
2 computer system
3 virtual machine
4 management software (management block)
11 CPU
12 memory
13 I/O CONTROLLER
14 disk device
15 physical network interface
16 cryptography processing accelerator
17 accelerator
31 communication application
32 communication processing module
33 cryptography processing module
34 specific function processing module
36 virtual network interface
41 virtual switch
42 information communication block
43 physical machine information management block
44 offloading determination block
45 policy management block
46 information communication block
321 communication processing block
322 communication processing block
331 bypass determination block
332 cryptography processing block
333 information communication block
334 policy management block
335 bypass determination block
336 specific function processing block
337 information communication block
411 packet processing block
412 offload processing block
414 virtual switch port
415 offload processing block
INF processing information

The invention claimed is:

1. A computer system for offloading cryptography processing comprising:
an accelerator for a cryptography processing;
a memory storing a program including instructions; and
a processor configured to execute the program to perform the instructions including:
operating a virtual machine; and
managing said virtual machine,
wherein said operating of said virtual machine is configured to perform instructions including:
cryptography processing with respect to a packet for transmission and a received packet;
wherein said managing said virtual machine is configured to perform instructions including:
operating a virtual switch configured to relay a packet transmitted and received by said virtual machine,
wherein said operating a virtual machine is configured to perform instructions further including:
requesting an offload of cryptography processing from the virtual machine to the virtual switch, regarding a first communication,
wherein said managing said virtual machine is configured to perform instructions further including:
determining, in response to said offload requesting, whether or not to permit the offloading regarding said first communication, based on whether or not the requested cryptography processing can be handled by said accelerator; and notifying said virtual machine of determination result information indicating the determination result, wherein said operating a virtual machine is configured to perform instructions further including:

notifying, if offloading regarding said first communication is permitted, said virtual switch of processing information required for said cryptography processing which is operated in the virtual machine, and wherein said managing said virtual machine is configured to perform instructions further including:

executing, by the virtual switch, said cryptography processing based on said processing information received from said virtual machine, by utilizing said accelerator, the computer system for offloading cryptography processing, comprising:

a physical machine comprising:
the memory storing a program including instructions;
the processor to execute the program;
the accelerator, comprising a cryptography processing accelerator to perform cryptography processing;

a management software operating on the physical machine and managing the virtual machine, the virtual machine comprising a cryptography processing module to perform cryptography processing, the management software comprising:

a virtual switch configured to relay communications regarding data packets transmitted and received by the virtual machine, the virtual switch including an offload processing module configured to perform cryptographic processing on data packets offloaded from the virtual machines using said cryptography processing accelerator of the physical machine;

wherein the processor when executing the instructions performs the steps comprising:

receiving an offload request for offloading a cryptography processing from a virtual machine to the virtual switch with respect to a first communication, the offload request specifying a type of cryptography processing required by the first communication;

determining, using the virtual switch whether or not to permit the offloading of said first communication based at least on whether or not the type of cryptography processing can be handled by said cryptography processing accelerator;

storing the determination result as offload availability information in an area of the memory;

determining whether or not to perform offloading of said first communication by referring to stored said offload availability information;

notifying, by the virtual switch, said virtual machine of the determination result;

wherein when the determination result indicates that offloading of the first communication is permitted, further comprises performing steps of:

notifying the virtual switch of processing information required for said cryptography processing, the processing information comprising at least an encryption key for encrypting the first communication;

transmitting the first communication from the virtual machine to the virtual switch; and executing, by the virtual switch, said cryptography processing based on said processing information using said cryptography processing accelerator; and when the determination result indicates that offloading of the first communication is not permitted, further comprises performing steps of:

executing, said cryptography processing for the first communication using the cryptography processing module of the virtual machine; and transmitting the encrypted first communication as a data packet to the virtual switch; and forwarding by the virtual switch the encrypted first communication to its destination.

2. The computer system according to claim 1, wherein said managing said virtual machine is configured to perform instructions further including:

storing, by said virtual switch, when receiving said processing information, said received processing information in a first memory area;

transmitting, after storing of said processing information in said first memory area is completed, a preparation completion notification to said virtual machine, wherein said operating a virtual machine is configured to perform instructions further including:

transmitting, after receiving said preparation completion notification, a packet of said first communication to said virtual switch without performing said cryptography processing with respect to the packet of said first communication, wherein said managing said virtual machine is configured to perform instructions further including:

receiving, by said virtual switch, the packet of said first communication from said virtual machine; and executing said cryptography processing with respect to the packet of said first communication based on said processing information regarding said first communication stored in said first memory area.

3. The computer system according to claim 2, wherein said managing said virtual machine is configured to perform instructions further including:

storing said determination result information as offload availability information in a second memory area; and determining whether or not to perform offloading regarding said first communication by referring to said offload availability information stored in said second memory area.

4. The computer system according to claim 3, wherein said managing said virtual machine is configured to perform instruction further including:

invalidating, if said first communication is ended, said determination result information regarding said first communication;

transmitting an invalidation request; and invalidating, by said virtual switch, in response to said invalidation request, said processing information regarding said first communication stored in said first memory area.

5. The computer system according to claim 3, wherein said managing said virtual machine is configured to perform instruction further including:

invalidating, by said virtual switch, if a packet of said first communication is neither transmitted nor received for a given period of time, said processing information regarding said first communication stored in said first memory area;
transmitting, by said virtual switch, an invalidation notification to said virtual machine; and
invalidating, in response to said invalidation notification, said offload availability information regarding said first communication.

6. The computer system according to claim 1,
wherein said operating a virtual machine is configured to perform instructions further including:
receiving, by said virtual switch, an encrypted communication, and
wherein said managing said virtual machine is configured to perform instruction further including:
decrypting, by said virtual switch, if said cryptography processing is offloaded to said virtual switch, a packet of said encrypted communication by referring to said processing information; and
performing, by said virtual switch, filtering depending on the packet data.

7. An offloading cryptography processing method in a computer system,
wherein said computer system comprises:
an accelerator for a cryptography processing;
a memory storing instructions; and
a processor configured to perform the instructions including:
operating a virtual machine; and
managing said virtual machine,
wherein said operating a virtual machine is configured to perform instructions including:
cryptography processing with respect to a packet for transmission and a received packet,
wherein said managing said virtual machine is configured to perform instructions including:
operating a virtual switch configured to relay a packet transmitted and received by said virtual machine,
wherein said offloading cryptography processing method comprises:
providing said virtual switch further configured to perform said cryptography processing;
requesting an offload of cryptography processing from the virtual machine to the virtual switch, regarding a first communication;
determining, in response to said offload requesting, whether or not to permit the offloading regarding said first communication, and notifying said virtual machine of determination result information indicating the determination result, based on whether or not the requested cryptography processing can be held by said accelerator;
notifying, if offloading regarding said first communication is permitted, said virtual switch of processing information required for said cryptography processing which is operated in the virtual machine; and
executing, by said virtual switch, said cryptography processing based on said processing information received from said virtual machine, by utilizing said accelerator, the computer system for offloading cryptography processing, comprising:
a physical machine comprising:
the memory storing a program including instructions;
the processor to execute the program;
the accelerator comprising a cryptography processing accelerator to perform cryptography processing;
a management software operating on the physical machine and managing the virtual machine the virtual machine comprising a cryptography processing module to perform cryptography processing, the management software comprising:
a virtual switch configured to relay communications regarding data packets transmitted and received by the virtual machine, the virtual switch including an offload processing module configured to perform cryptographic processing, on data packets offloaded from the virtual machines using the cryptography processing accelerator of the physical machine;
wherein the processor when executing the instructions performs the steps comprising:
receiving an offload request for offloading a cryptography processing from a virtual machine to the virtual switch, with respect to a first communication, the offload request specifying a type of cryptography processing required by the first communication;
determining using the virtual switch whether or not to permit the offloading of said first communication based at least on whether or not the type of cryptography processing can be handled by said cryptography processing accelerator;
storing the determination result as offload availability information in an area of the memory;
determining whether or not to perform offloading of said first communication by referring to stored said offload availability information;
notifying, by the virtual switch, said virtual machine of the determination result;
wherein when the determination result indicates that offloading of the first communication is permitted, further comprises performing steps of:
notifying the virtual switch of processing information required for said cryptography processing, the processing information comprising at least an encryption key for encrypting the first communication;
transmitting the first communication from the virtual machine to the virtual switch; and
executing, by the virtual switch, said cryptography processing based on said processing information using said cryptography processing accelerator;
when the determination result indicates that offloading of the first communication is not permitted, further comprises performing steps of:
executing said cryptography processing for the first communication using the cryptography processing module of the virtual machine; and
transmitting the encrypted first communication as a data packet to the virtual switch; and
forwarding by the virtual switch the encrypted first communication to its destination.

8. A program recorded on a tangible non-transitory computer-readable medium that, when executed by a physical machine, constructs a computer system on said physical machine,
wherein said computer system comprises:
a memory storing instructions; and
a processor configured to perform the instructions including:
operating a virtual machine; and
managing said virtual machine,
wherein said operating of said virtual machine is configured to perform instructions including:
cryptography processing with respect to a packet for transmission and received packet, wherein said managing said virtual machine is configured to perform instructions including:
  operating a virtual switch configured to relay a packet transmitted and received by said virtual machine,
wherein said operating a virtual machine is configured to perform instructions further including:
  requesting an offload of cryptography processing from the virtual machine to the virtual switch, regarding a first communication,
wherein said managing said virtual machine is configured to perform instructions further including:
  determining, in response to said offload requesting, whether or not to permit the offloading regarding said first communication, based on whether or not the requested cryptography processing can be handled by an accelerator; and
  notifying said virtual machine of determination result information indicating the determination result,
wherein said operating a virtual machine is configured to perform instructions further including:
  notifying, if offloading regarding said first communication is permitted, said virtual switch of processing information required for said cryptography processing which is operated in the virtual machine, and
wherein said managing said virtual machine is configured to perform instructions further including:
  executing, by the virtual switch, said cryptography processing based on said processing information received from said virtual machine, by utilizing said accelerator,
the computer system for offloading cryptography processing, comprising:
a physical machine comprising:
  the memory storing a program including instructions;
  the processor to execute the program;
  the accelerator comprising a cryptography processing accelerator to perform cryptography processing;
a management software operating on the physical machine and managing the virtual machine, the virtual machine comprising a cryptography processing module to perform cryptography processing, the management software comprising:
  a virtual switch configured to relay communications regarding data packets transmitted and received by the virtual machine, the virtual switch including an offload processing module configured to perform cryptographic processing, on data packets offloaded from the virtual machine using the cryptography processing accelerator of the physical machine;
wherein the processor when executing the instructions performs the steps comprising:
  receiving an offload request for offloading a cryptography processing from a virtual machine to the virtual switch with respect to a first communication, the offload request specifying a type of cryptography processing required by the first communication;
  determining, using the virtual switch, whether or not to permit the offloading of said first communication based at least on whether or not the type of cryptography processing can be handled by said cryptography processing accelerator;
  storing the determination result as offload availability information in an area of the memory;
  determining whether or not to perform offloading of said first communication by referring to stored said offload availability information;
  notifying by the virtual switch to said virtual machine of the determination result;
  wherein when the determination result, indicates that offloading of the first communication is permitted, further comprises performing steps of:
    notifying the virtual switch of processing information required for said cryptography processing, the processing information comprising at least an encryption key for encrypting the first communication; and
    transmitting the first communication from the virtual machine to the virtual switch; and
    executing, by the virtual switch, said cryptography processing based on said processing information using said cryptography processing accelerator; and
  when the determination result indicates that offloading of the first communication is not permitted, further comprises performing steps of:
    executing said cryptography processing for the first communication by using the cryptography processing module of the virtual machine; and
    transmitting the encrypted first communication as a data packet to the virtual switch; and
  forwarding by the virtual switch the encrypted first communication to its destination.

9. The computer system according to claim 1, wherein said managing said virtual machine is configured to perform instructions further including:
  executing the cryptography processing.

10. The computer system according to claim 1, wherein said managing said virtual machine is configured to perform instructions further including:
  offloading the cryptography processing by the virtual machine to the virtual switch.

11. The computer system according to claim 1,
  wherein the cryptography processing includes a data encryption processing or a data decryption processing performed on data,
  wherein a program including said instructions of said managing said virtual machine and stored in a non-transitory computer readable medium performs a same encryption or decryption processing as the virtual machine,
  wherein the first communication includes a communication of the packet for transmission and the received packet, and
  wherein said managing said virtual machine is configured to perform instructions further including:
    determining whether or not to permit offloading regarding said first communication based on a current load of the virtual machine.

12. The computer system according to claim 1, wherein the cryptography processing including an encryption operation is performed at a terminal point by the virtual machine at first and is offloaded to a processing side of the virtual switch.

13. The computer system according to claim 1, further comprising:
  a non-transitory computer readable medium storing the program,
  wherein the processor operates on a physical machine.

14. The computer system according to claim 1, wherein the processor when executing the instructions in memory further performs the steps comprising:
  storing, by said virtual switch, processing information in a first memory area;

transmitting, after storing of said processing Information in said first memory area is completed, a preparation completion notification to said virtual machine, transmitting by the virtual machine, after receiving said preparation completion notification, a packet of said first communication to said virtual switch without performing said cryptography processing with respect to the packet of said first communication, receiving, by said virtual switch, the packet of said first communication from said virtual machine; and executing said cryptography processing with respect to the packet of said first communication based on said processing information regarding said first communication stored in said first memory area.

15. The computer system according to claim 1, the computer system for offloading cryptography processing from the virtual machine to a management software, comprising:
a physical machine comprising:
the memory storing a program including instructions;
the processor to execute a program;
the accelerator including a cryptography processing accelerator to perform cryptography processing;
a management software operating on the physical machine and coupled to a plurality of virtual machines, each virtual machine comprises a cryptography processing module to perform cryptography processing, the management software comprising:
a virtual switch to relay communications regarding data packets transmitted to virtual machine that were received from the physical machine, the virtual switch including an offload processing module to perform cryptographic processing including encrypting the packets, on data packets offloaded from the plurality of virtual machines by utilizing the cryptography processing accelerator of the physical machine;
wherein the processor when executing the instructions in memory perform the steps comprising:
receiving an offload request for offloading a cryptography processing from a virtual machine to the virtual switch, regarding a first communication, wherein the offload request includes a type of cryptography processing required by the first communication;
determining by the virtual switch in response to said offload request, whether or not to permit the offloading regarding said first communication, wherein the determining is based at least on whether or not the type of cryptography processing required to be performed on the first commination can be handled by said cryptography processing accelerator;
storing the exterminating result as offload availability information in an area of the memory;
determining whether or not to perform offloading regarding said first communication by referring to stored said offload availability information; and
notifying by the virtual switch to said virtual machine of the determination of offload.

16. The computer system according to claim 1, the computer system for offloading cryptography processing from the virtual machine to a management software, comprising:
a physical machine comprising:
the memory storing a program including instructions;
the processor to execute the program;
the accelerator including a cryptography processing accelerator to perform cryptography processing;
a management software operating on the physical machine and coupled to a plurality of virtual machines, each virtual machine comprises a cryptography processing module to perform cryptography processing, the management software comprising:
a virtual switch to relay communications regarding data packets transmitted to virtual machine that were received from the physical machine, the virtual switch including an offload processing module to perform cryptographic processing including encrypting the packets, on data packets offloaded from the plurality of virtual machines by utilizing the cryptography processing accelerator of the physical machine.

17. The computer system according to claim 1, the computer system for offloading cryptography processing from the virtual machine to a management software, further comprising a physical machine, comprising:
the accelerator for a cryptography processing;
the memory storing a program including instructions; and
the processor;
a management software operating on the physical machine and coupled to a plurality of virtual machines, each virtual machine comprises a cryptography processing module to perform cryptography processing.

* * * * *